(12) United States Patent
Suzuki et al.

(10) Patent No.: US 8,564,627 B2
(45) Date of Patent: Oct. 22, 2013

(54) IMAGE DISPLAY DEVICE AND METHOD OF DRIVING IMAGE DISPLAY DEVICE

(75) Inventors: Toshiaki Suzuki, Kanagawa (JP); Tsuyoshi Kamada, Kanagawa (JP)

(73) Assignee: Sony Corporation (JP)

( * ) Notice: Subject to any disclaimer, the term of this patent is extended or adjusted under 35 U.S.C. 154(b) by 407 days.

(21) Appl. No.: 12/924,216

(22) Filed: Sep. 23, 2010

(65) Prior Publication Data

US 2011/0169871 A1    Jul. 14, 2011

(30) Foreign Application Priority Data

Oct. 2, 2009  (JP) ................................ P2009-230318

(51) Int. Cl.
  *G09G 5/10*    (2006.01)
(52) U.S. Cl.
  USPC ................ 345/690; 345/89; 345/99; 345/100
(58) Field of Classification Search
  USPC ..................................... 345/690, 89, 99–100
  See application file for complete search history.

(56) References Cited

U.S. PATENT DOCUMENTS

| 5,808,594 A * | 9/1998 | Tsuboyama et al. | 345/89 |
| 5,874,933 A * | 2/1999 | Hirai et al. | 345/89 |
| 2005/0253797 A1 | 11/2005 | Kamada et al. | |
| 2007/0279566 A1 * | 12/2007 | Huang | 349/143 |

FOREIGN PATENT DOCUMENTS

| JP | 11-095722 A | 4/1999 |
| JP | 2005-316211 A | 11/2005 |

\* cited by examiner

*Primary Examiner* — William Boddie
*Assistant Examiner* — Leonid Shapiro
(74) *Attorney, Agent, or Firm* — Lerner, David, Littenberg, Krumholz & Mentlik, LLP

(57) ABSTRACT

An image display device includes: a display panel including gate lines extending in a horizontal direction, source lines extending in a vertical direction to intersect gate lines, and sub-pixel electrodes arranged in intersections of the gate lines and the source lines; and a drive control section performing a drive control of the display panel using first or second drive mode. In the first drive mode, the drive control section performs display drive such that two sub-pixel electrodes are driven based on different gray scale values and that a combination of adjacent two sub-pixel electrodes is treated as a single pixel, the sub-pixel electrodes being arranged along a gate line and arranged on two respective source lines. In the second drive mode, the drive control section performs display drive such that N sub-pixel electrodes consecutively arranged along a source line are treated as a unit pixel to be driven.

12 Claims, 18 Drawing Sheets

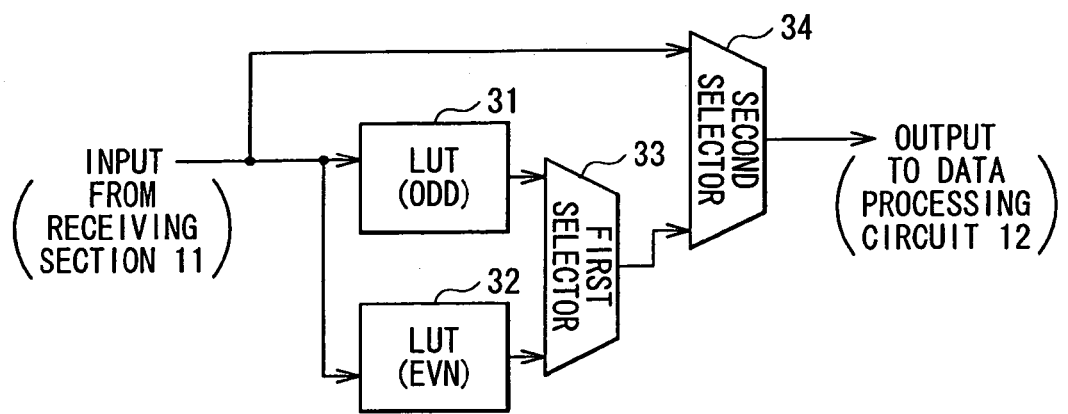
F I G. 13

IMAGE DISPLAY DEVICE AND METHOD OF DRIVING IMAGE DISPLAY DEVICE

CROSS-REFERENCE TO RELATED APPLICATION

The present application claims priority from Japanese Patent Application No. JP 2009-230318 filed in the Japanese Patent Office on Oct. 2, 2009, the entire content of which is incorporated herein by reference.

BACKGROUND OF THE INVENTION

1. Field of the Invention

The present invention relates to an image display device, for example, utilized in a glass-type three dimensional display, and a method of driving the same.

2. Description of the Related Art

From the past, there has been known a glass-type three dimensional display device realizing stereoscopic viewing by allowing an observer to wear special glasses utilizing liquid crystal shutters for the stereoscopic viewing, and leading both eyes of the observer to view different images having a parallax therebetween. To realize the stereoscopic viewing, since it is necessary to allow a left eye and a right eye to view different parallax images, two parallax images of the image for left eye and the image for right eye are necessary. In the glass-type three dimensional display device, the image for the left eye and the image for the right eye are time-divisionally alternately displayed on a two dimensional display panel, and a left-eye shutter and a right-eye shutter of liquid crystal shutter glasses are alternately controlled to turn on/off (open/close) in synchronization with the display timing of the image for the left eye and the image for the right eye, thereby realizing the stereoscopic viewing.

SUMMARY OF THE INVENTION

In the three dimensional display device, in the case where the images having a binocular parallax therebetween are displayed on the two dimensional display panel, if display intervals of the parallax images of left and right are too long, flicker are generated. To solve this issue, a method in which the parallax images of left and right are time-divisionally displayed in a typical frame frequency period of 60 Hz (or 50 Hz) has been developed. In this case, each parallax image is displayed at a frame frequency of 120 Hz (or 100 Hz). In this case, as the two dimensional display panel, the drive performance at the frame frequency of 120 Hz which is a double speed of a typical drive at the frame frequency of 60 Hz is necessary. In Japanese Unexamined Patent Publication No. Hei 11-95722, in the case where a plasma display panel is used as the two dimensional display panel, the double speed drive is realized by scanning two horizontal lines at the same time. In the method in which the two horizontal lines are scanned at the same time, the display resolution in the vertical direction is reduced by half. In Japanese Unexamined Patent Publication No. Hei 11-95722, a combination of the two horizontal lines which are scanned at the same time is changed in odd number fields and even number fields, and thus the reduction of the display resolution is moderated. Meanwhile, in the case of a liquid crystal display panel, a liquid crystal display panel capable of the double speed drive at the frame frequency of 120 Hz has been already commercialized in recent years, and it may be possible to time-divisionally display the parallax images of left and right in the frame frequency period of 60 Hz (or 50 Hz) without reducing the display resolution.

However, in the case of the liquid crystal display, there is an issue in the response speed of liquid crystal, and a delay may occur during the period from when a drive signal is applied to when images are completely switched. Thus, in the case where the parallax images of left and right are time-divisionally displayed, when each of the parallax images of left and right is switched and displayed at each frequency of 120 Hz (100 Hz), the parallax images of left and right are not completely switched. Further, in the scanning at the frequency of 120 Hz (100 Hz), since the image is updated at almost any time, there is no time when a display image is fixed (stopped) on the whole screen. Therefore, there is no appropriate timing that the shutters of the liquid crystal shutter glasses are opened to allow the left eye and right eye to separately view the parallax images of left and right, and crosstalk in which the parallax images of left and right are mixed and displayed may occur. For example, in the case where a backlight is lighted up at any time, and the screen is scanned from the top to the bottom, the crosstalk is deteriorated toward the top and the bottom of the screen, in particular. To improve this, a method in which each of the parallax images of left and right is time-divisionally displayed twice is considered. For example, when the image for the left eye is referred to as L, and the image for the right eye is referred to as R, a method in which the images are displayed in the order of L, L, R, and R in the frame frequency period of 60 Hz is considered. In this case, by displaying the same image twice, the timing that the parallax images of left and right are switched is improved in comparison with the case where the parallax images of left and right are alternately displayed. The crosstalk is improved by controlling the shutters of the liquid crystal shutter glasses to turn on/off at the timing that the parallax images of left and right are sufficiently switched. Further, a method in which a gray (or black) image is inserted is considered. In this case, when the gray image is referred to as Gr, a method in which the images are displayed in the order of, for example, L, Gr, R, and Gr in the frame frequency period of 60 Hz is considered. Since the gray image Gr is inserted between the image for the left eye L and the image for the right eye R, mixing of the parallax images of left and right is reduced. Further, in the case where the black image is inserted, a method in which the backlight is controlled to light up in synchronization with the write scanning of pixels is also used in most cases. Therefore mixing of the images of left and right is reduced.

To perform the above-described display of L, L, R, and R, or the like, it is necessary to display each parallax image and the gray image at the frame frequency of 240 Hz or more. Recently, as a high-grade model of a liquid crystal display panel, a liquid crystal display panel capable of drive at the frame frequency of 240 Hz (or 200 Hz) which is a quadruple speed of the typical drive speed at the frame frequency of 60 Hz (or 50 Hz) has been developed. By using such a liquid crystal display panel, it may be possible to perform the above-described display of L, L, R, and R, or the like. However, in consideration of various market needs, a model other than the high-grade model is also demanded to perform the above-described display of L, L, R, and R, or the like. For example, in a model having the drive performance at the frame frequency of 120 Hz, the quasi drive speed at the frame frequency of 240 Hz is demanded. In this case, like the technique described in Japanese Unexamined Patent Publication No. Hei 11-95722, it is considered to increase the drive speed by scanning two horizontal lines at the same time. However, the technique described in Japanese Unexamined Patent Publication No. Hei 11-95722 is a driving method applied to a plasma display panel, and it is not always true that the technique is suitable for driving a liquid crystal display panel.

For example, as described in Japanese Unexamined Patent Publication No. 2005-316211, there is an issue in the liquid crystal display that the viewing angle characteristic of a gray scale is varied in the case where the liquid crystal display panel is viewed from different directions, and the half tone technique is used to improve this issue. In the half tone technique, one pixel is divided into a first sub-pixel electrode and a second sub-pixel electrode having areas different from each other, and the sub-pixel electrodes are driven based on gray scale values different from each other, thereby improving the viewing angle characteristic of the gray scale. The technique described in Japanese Unexamined Patent Publication No. Hei 11-95722 is the driving method applied to the plasma display panel, and there is no specific description of how to scan each of the sub-pixel electrodes in the liquid crystal display panel in which one pixel is divided for improving the viewing angle characteristic.

In view of the foregoing, it is desirable to provide an image display device, for example, capable of a quasi drive at a frequency of 240 Hz in a liquid crystal display panel having a drive performance at the frequency of 120 Hz, and a method of driving the same.

An image display device according to an embodiment of the present invention includes: a display panel including a plurality of gate lines for scanning which extend in a horizontal direction, a plurality of source lines which extend in a vertical direction to intersect the plurality of gate lines, and to which a drive signal in response to an input image signal is input, and a plurality of sub-pixel electrodes which are arranged one by one in positions corresponding to intersections of the plurality of gate lines and the plurality of source lines, and which may be independently driven and controlled. Further, the image display device includes a drive control section driving and controlling the display panel by selectively using two drive modes of a first drive mode and a second drive mode, the first drive mode sequentially selecting the plurality of gate lines by one line to scan the plurality of sub-pixel electrodes by one horizontal line, and the second drive mode sequentially selecting the plurality of gate lines by N (N is an integer of 2 or more) lines at the same time to scan the plurality of sub-pixel electrodes by N horizontal lines, thereby displaying an image in response to the input image signal on the display panel. In the first drive mode, the drive control section drives two sub-pixel electrodes based on gray scale values different from each other, the two sub-pixel electrodes arranged adjacent to each other in the horizontal direction along the same gate line, and arranged on two different source lines, and treats a combination of the two sub-pixel electrodes as a single pixel, thereby driving a display. In the second drive mode, the drive control section treats N sub-pixel electrodes consecutively arranged in the vertical direction on the same source line as a unit pixel to be driven, thereby driving the display.

In the image display device according to the embodiment of the present invention, the plurality of sub-pixel electrodes are formed of two types of sub-pixel electrodes of a first sub-pixel electrode, and a second sub-pixel electrode having an area different from that of the first sub-pixel electrode, and the two types of sub-pixel electrodes may be alternately arranged in the horizontal direction and the vertical direction. In this case, for example, in the first drive mode, the drive control section drives the first sub-pixel electrode and the second sub-pixel electrode based on the gray scale values different from each other, the first sub-pixel electrode and the second sub-pixel electrode arranged adjacent to each other in the horizontal direction along the same gate line, and arranged on the two different source lines, and treats the combination of the first sub-pixel electrode and the second sub-pixel electrode as the single pixel, thereby driving the display. In the second drive mode, the drive control section sequentially selects the plurality of gate lines by two lines at the same time to scan the plurality of sub-pixel electrodes by two horizontal lines, and treats the first sub-pixel electrode and the second sub-pixel electrode as the single pixel, the first sub-pixel electrode and the second sub-pixel electrode arranged adjacent to each other in the vertical direction on the same source line, and arranged on the two difference gate lines, thereby driving the display. In the case of this driving method, in the first drive mode, since the half tone drive in which the two sub-pixel electrodes in the one pixel are driven based on the gray scale values different from each other, the viewing angle characteristic of the gray scale is improved. In the second drive mode, since the two sub-pixel electrodes arranged adjacent to each other in the vertical direction on the same source line are treated as the single pixel, and the display drive is performed, although the half tone drive may not be performed, it may be possible to obtain the drive speed twice the drive speed of the first drive mode, without reducing the display resolution.

In the image display device according to the embodiment of the present invention, the plurality of sub-pixel electrodes are formed of the two types of sub-pixel electrodes of the first sub-pixel electrode, and the second sub-pixel electrode having the area different from that of the first sub-pixel electrode, and the two types of sub-pixel electrodes may be alternately arranged in the horizontal direction, and the same type of sub-pixel electrodes may periodically appear by the N lines in the vertical direction. In this case, for example, in the first drive mode, the drive control section drives the first sub-pixel electrode and the second sub-pixel electrode based on the gray scale values different from each other, the first sub-pixel electrode and the second sub-pixel electrode arranged adjacent to each other in the horizontal direction along the same gate line, and arranged on the two different source lines. In addition, the drive control section treats the combination of the first sub-pixel electrode and the second sub-pixel electrode as the single pixel, thereby driving the display. In the second drive mode, the drive control section drives first sub-pixel electrodes and second sub-pixel electrodes to have the gray scale values different from each other in the horizontal direction, the first sub-pixel electrodes consecutively arranged by N in the vertical direction on a first source line, and the second sub-pixel electrodes consecutively arranged by N in the vertical direction on a second source line arranged adjacent to the first source line. In addition, the drive control section treats the combination of N first sub-pixel electrodes and N second sub-pixel electrodes as the single pixel, thereby driving the display. In the case of this driving method, in the first drive mode, since the half tone drive in which the two sub-pixel electrodes in the one pixel are driven based on the gray scale values different from each other is performed, the viewing angle characteristic of the gray scale is improved. In the second drive mode, since the plurality of gate lines are sequentially selected by the N lines at the same time to scan the plurality of sub-pixel electrodes by the N horizontal lines, it may be possible to obtain the drive speed N times the drive speed of the first drive mode. At this time, since the first sub-pixel electrodes and second sub-pixel electrodes are driven to have the gray scale values different from each other, the first sub-pixel electrodes consecutively arranged by N in the vertical direction on the first source line, and the second sub-pixel electrodes consecutively arranged by N in the vertical direction on the second source line, the half tone drive is performed while the drive speed of N times is obtained. Therefore, although the display resolution is reduced, it may be possible to obtain the drive speed N times the drive speed of the first drive mode, while the effect of improving the viewing angle characteristic of the gray scale is obtained.

An image display device according to another embodiment of the present invention includes: a display panel including a plurality of gate lines for scanning which extend in a horizontal direction, a plurality of source lines which extend in a vertical direction to intersect the plurality of gate lines, and to which a drive signal in response to an input image signal is input, and a plurality of sub-pixel electrodes which are arranged one by one in positions corresponding to intersections of the plurality of gate lines and the plurality of source lines, and which may be independently driven and controlled. Further, the image display device includes a drive control section selectively driving and controlling the display panel by using two drive modes of a first drive mode and a second drive mode, the first drive mode sequentially selecting the plurality of gate lines by one line to scan the plurality of sub-pixel electrodes by one horizontal line, and the second drive mode sequentially selecting the plurality of gate lines by N (N is an integer of 2 or more) lines at the same time to scan the plurality of sub-pixel electrodes by N horizontal lines. In the first drive mode, the drive control section drives two sub-pixel electrodes based on gray scale values different from each other, the two sub-pixel electrodes arranged adjacent to each other in the horizontal direction along the same gate line, and arranged on two difference source lines. In addition, the drive control section treats a combination of the two sub-pixel electrodes as a single pixel, thereby driving a display. In the second drive mode, the drive control section treats the combination of the N sub-pixel electrodes consecutively arranged in the vertical direction on the first source line, and the N sub-pixel electrodes consecutively arranged in the vertical direction on the second source line adjacent to the first source line as a single pixel, thereby driving the display.

In the image display device according to the embodiment of the present invention, in the first drive mode, since the half tone drive in which the two sub-pixel electrodes in the one pixel are driven based on the gray scale values different from each other is performed, the viewing angle characteristic of the gray scale is improved. In the second drive mode, since the plurality of gate lines are sequentially selected by the N lines at the same time to scan the plurality of sub-pixel electrodes by the N horizontal lines, it may be possible to obtain the drive speed N times the drive speed of the first drive mode.

According to the embodiments of the present invention, in the second drive mode, since the plurality of gate lines are sequentially selected by the N lines at the same time to scan the plurality of sub-pixel electrodes by the N horizontal lines, it may be possible to obtain the drive speed N times the drive speed of the first drive mode. For example, in the second drive mode, since the plurality of gate lines are sequentially selected by the two lines at the same time to perform the scanning, the quasi drive at a frame frequency of 240 Hz may be performed in a liquid crystal display panel having the drive performance at the frame frequency of 120 Hz.

In particular, in the image display device according to the embodiment, in the second drive mode, in the case where the two sub-pixel electrodes arranged adjacent to each other in the vertical direction on the same source line are treated as the single pixel, and the display drive is performed, it may be possible to obtain the drive speed twice the drive speed of the first drive mode without reducing the display resolution.

In particular, in the image display device according to the embodiment, in the case where the first sub-pixel electrodes and the second sub-pixel electrodes are driven to have the gray scale values different from each other in the horizontal direction, the first sub-pixel electrodes consecutively arranged by N in the vertical direction on the first source line, and the second sub-pixel electrodes consecutively arranged by N in the vertical direction on the second source line, it may be possible to perform the half tone drive while the drive speed of N times is obtained. Therefore, it may be possible to obtain the drive speed N times the drive speed of the first drive mode, while the effect of improving the viewing angle characteristic of the gray scale is obtained.

Other and further objects, features and advantages of the invention will appear more fully from the following description.

BRIEF DESCRIPTION OF THE DRAWINGS

FIG. 13 is a block diagram illustrating a first structural example of a 3D gamma converting circuit in the image display device according to the third embodiment.

DETAILED DESCRIPTION OF THE PREFERRED EMBODIMENTS

Hereinafter, embodiments of the present invention will be described in detail with reference to the drawings.

1. First Embodiment (Overall Structure of Image Display Device)

Figure 1:
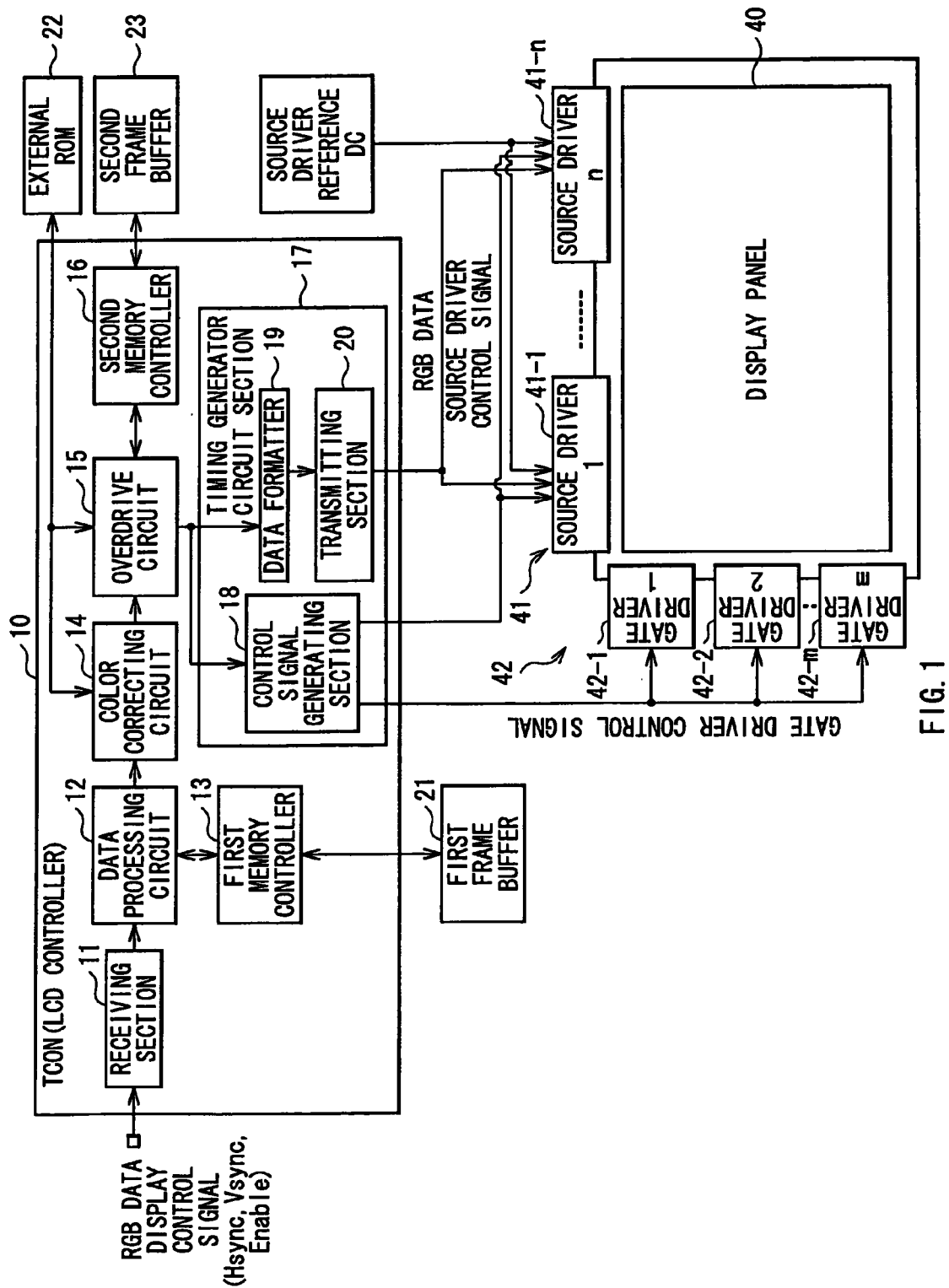
FIG. 1 is a block diagram illustrating the circuit structure of an image display device according to a first embodiment of the present invention.

FIG. 1 is a block diagram illustrating the overall structure of an image display device according to a first embodiment of the present invention. This image display device may be used, for example, as a glass type three dimensional display device. The image display device includes a timing controller (TCON) (LCD controller) 10, a first frame buffer 21, an external ROM (read only memory) 22, a second frame buffer 23, and a display panel 40. The image display device also includes a source driver 41 connected to a plurality of source lines of the display panel 40, and a gate driver 42 connected to a plurality of gate lines of the display panel 40. The source driver 41 is composed of a plurality of drivers 41-1, 41-2, . . . 41-n, and the predetermined number of the source lines are connected to the drivers, respectively. The gate driver 42 is composed of a plurality of drivers 42-1, 42-2, . . . 42-m, and the predetermined number of gate lines are connected to the drivers, respectively. In FIG. 1, a circuit section except the display panel 40 corresponds to a specific example of "drive control section" in the present invention.

The display panel 40 is, for example, a transmissive liquid crystal panel displaying an image by controlling a passage of light emitted from a backlight 3 with liquid crystal molecules. Although not illustrated in the figure, the display panel 40 includes a pixel electrode substrate, a facing substrate arranged so as to face the pixel electrode substrate, and a liquid crystal layer sealed between the pixel electrode substrate and the facing substrate. On the liquid crystal layer side of the facing substrate, planar common electrodes to which a common potential VC is applied are uniformly formed. On the liquid crystal layer side of the pixel electrode substrate, a plurality of pixel electrodes is formed in a matrix. The common electrode and the pixel electrode are formed by a transparent electrode of, for example, ITO (indium-tin oxide).

(Basic Structure of Pixel Electrode in the Display Panel 40)

Figure 2:
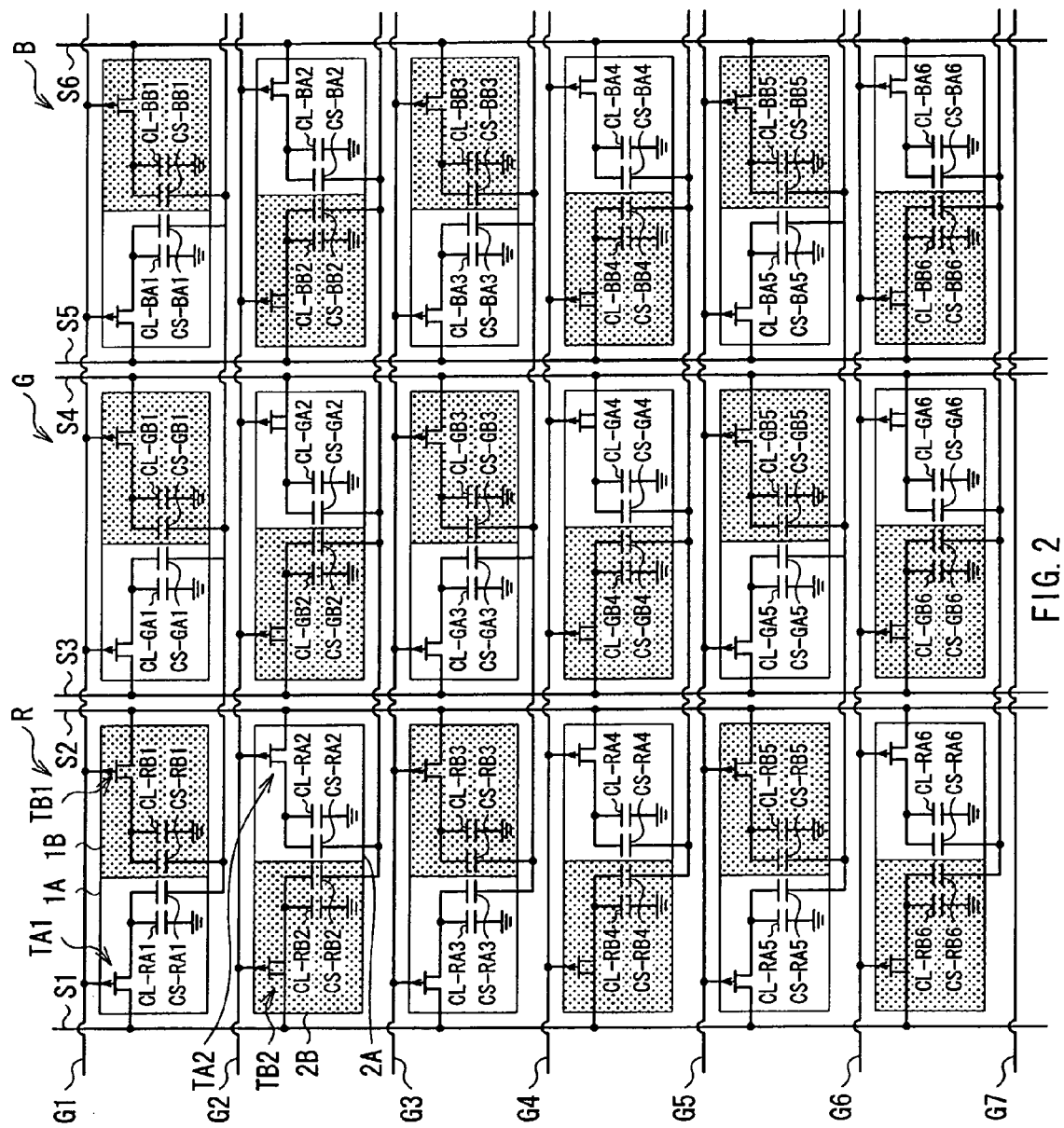
FIG. 2 is a structural view illustrating the basic structure of a pixel electrode of a display panel in the image display device according to the first embodiment, and schematically illustrating a combination example of sub-pixel electrodes in the case where a typical drive (first drive mode) is performed.

FIG. 2 is a structural view illustrating the basic structure of the pixel electrode in the display panel 40. FIG. 2 also schematically illustrates a combination example of sub-pixel electrodes in the case where a typical drive (first drive mode) which will be described later is performed. On the pixel electrode substrate of the display panel 40, a plurality of gate lines G1, G2, G3 . . . for scanning which extend in the horizontal direction, a plurality of source lines S1, S2, S3 . . . to which a drive signal in response to an input image signal is input, and a plurality of sub-pixel electrodes are provided. The plurality of source lines S1, S2, S3 . . . extend in the vertical direction to intersect the plurality of gate lines G1, G2, G3 . . . . The sub-pixel electrodes are arranged one by one in positions corresponding to intersections of the plurality of gate lines G1, G2, G3 . . . , and the plurality of source lines S1, S2, S3 . . . . In the structural example of FIG. 2, the sub-pixel electrodes connected to the first source line S1 and the second source line S2 are pixel electrodes for red, and the sub-pixel electrodes connected to the third source line S3 and the fourth source line S4 are pixel electrodes for green. The sub-pixel electrodes connected to the fifth source line S5 and the sixth source line S6 are pixel electrodes for blue. In addition, in the description of this embodiment, the expression "one pixel" denotes a unit pixel of each color.

Switching elements T of thin film transistors are connected to the plurality of sub-pixel electrodes, respectively, and the plurality of sub-pixel electrodes may be independently controlled and driven, respectively. The plurality of sub-pixel electrodes are composed of two types of sub-pixel electrodes which are a first sub-pixel electrode A, and a second sub-pixel electrode B having an area different from that of the first sub-pixel electrode A. The two types of sub-pixel electrodes are alternately arranged in the horizontal direction and the vertical direction. The second sub-pixel electrode B has the area larger than that of the first sub-pixel electrode A. At the time of the typical drive (first drive mode), a combination of the first sub-pixel electrode A and the second sub-pixel electrode B which are adjacent to each other in the horizontal direction is treated as a single pixel, and the drive is performed.

Here, the pixel structure will be specifically described with an example of a first sub-pixel electrode 1A and a second sub-pixel electrode 1B arranged at the upper left in FIG. 2, and an other first sub-pixel electrode 2A and an other second sub-pixel electrode 2B arranged on the lower side of the first sub-pixel electrode 1A and the second sub-pixel electrode 1B. In FIG. 2, for example, in a portion corresponding to the first sub-pixel electrode 1A arranged at the upper left, a pixel capacity CL-RA1, and an auxiliary capacity CS-RA1 are formed. The pixel capacity CL-RA1 is a capacity formed between the first sub-pixel electrode 1A and a not-illustrated common electrode on the facing substrate side. The auxiliary capacity CS-RA1 is a capacity formed between the first sub-pixel electrode 1A and an auxiliary capacity bus line.

The first sub-pixel electrode 1A and the second sub-pixel electrode 1B are connected in common to the first gate line G1 through switching elements TA1 and TB1. The other first sub-pixel electrode 2A, and the other second sub-pixel electrode 2B are connected in common to the second gate line G2 through other switching elements TA2 and TB2.

Figure 4A:
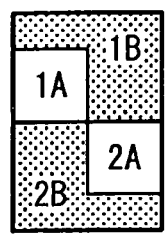
FIG. 4A is an explanation view illustrating the combination example of the sub-pixel electrodes in the first drive mode.

FIG. 4A is an explanation view illustrating an example of the electrode shapes of the first sub-pixel electrode 1A and the second sub-pixel electrode 1B, and the other first sub-pixel electrode 2A and the other second sub-pixel electrode 2B. Here, a combination of the first sub-pixel electrode 1A and the second sub-pixel electrode 1B is treated as a first pixel, and a combination of the other first sub-pixel electrode 2A and the other second sub-pixel electrode 2B is treated as a second pixel. At this time, the electrodes are arranged in such a manner that the gravity position when a formation region of the first sub-pixel electrode 1A, and a formation region of the other first sub-pixel electrode 2A are combined approximately corresponds to the center position of the whole region where the first pixel and the second pixel are formed.

(Circuit Structure of Drive Control Section)

Referring back to FIG. 1, the circuit structure will be described. The timing controller 10 includes a receiving section 11, a data processing circuit 12, a first memory controller 13, a color correcting circuit 14, an overdrive circuit 15, a second memory controller 16, and a timing generator circuit section 17. The timing generator circuit section 17 includes a control signal generating section 18, a data formatter 19, and a transmitting section 20.

The timing controller 10 drives the display panel 40 by controlling the source driver 41 and the gate driver 42 based on the input image signal. The timing controller 10 selectively uses two drive modes of the first drive mode and the second drive mode to display an image in response to the input image signal on the display panel.

Here, in the first drive mode, the plurality of gate lines G1, G2, G3 . . . on the display panel 40 are sequentially selected by one line to scan the plurality of sub-pixel electrodes by one horizontal line. In the second drive mode, the plurality of gate lines G1, G2, G3 . . . on the display panel 40 are sequentially selected by two lines at the same time to consecutively scan the plurality of sub-pixel electrodes by two horizontal lines. The first drive mode is a scanning mode at the typical drive speed, and the second drive mode is a scanning mode performing the drive at a quasi-double drive speed of the drive speed of the first drive mode.

The external ROM 22 stores an operation setting inside the timing controller 10. For example, in the timing controller 10, the first frame buffer 21 and the second frame buffer 23 temporarily store image information for performing a signal processing of an image between frames. The gate driver 42 turns on the switching element T which is connected to each sub-pixel electrode of the display panel 40 by a unit of one horizontal line. The source driver 41 supplies a potential corresponding to display data to pixels of the horizontal line selected by the gate driver 42.

Figure 5B:
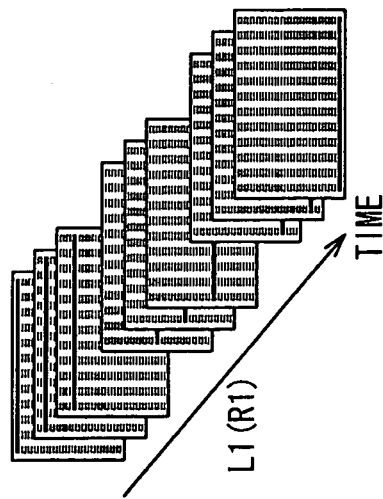
FIG. 5B is an explanation view schematically illustrating the state where the input image illustrated in FIG. 5A is displayed in the first drive mode.
Figure 5A:
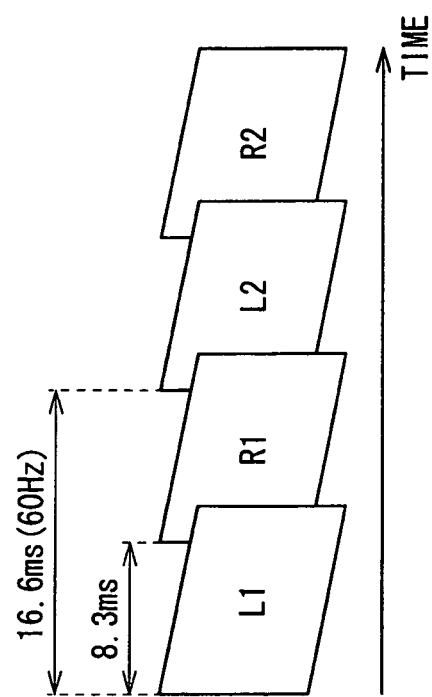
FIG. 5A is an explanation view schematically illustrating the state where a three dimensional image including each of an image for a left eye and an image for a right eye is input in a frame frequency period of 60 Hz.

The receiving section 11 receives the input image signal transmitted from the external. As the input image signal, for example, a signal including an image data signal of R (red), G (green), and B (blue), and a display control signal (a vertical synchronization signal Vsync, a horizontal synchronization signal Hsync, and a writing control signal Enable) is input. As illustrated in FIG. 5A, for example, the image data signal is a three dimensional image signal time-divisionally alternately including the images for the left eye L1, L2 . . . , and the images for the right eye R1, R2 . . . having parallax therebetween. For example, in a frame frequency period of 60 Hz (16.6 ms), one parallax image of left and one parallax image of right are included. In this case, each parallax image is updated at 120 Hz (8.3 ms). In the case where the images having the frame structure illustrated in FIG. 5A are displayed, the timing controller 10 drives the display panel 40 in the first drive mode so that the display panel 40 is scanned by one horizontal line as illustrated in FIG. 5B.

The data processing circuit 12 converts a frame rate of the input image signal. The first memory controller 13 controls writing and reading of image information between the data processing circuit 12 and the first frame buffer 21.

Figures 6A, 6B:
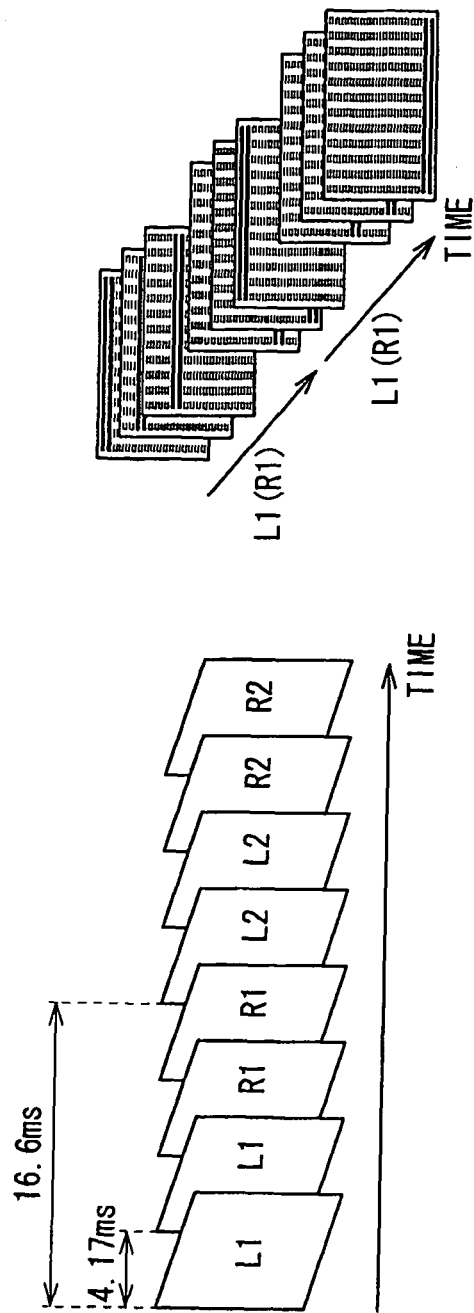
FIG. 6A is an explanation view schematically illustrating the state where a three dimensional image includes two images for the left eye and two images for the right eye in the frame frequency period of 60 Hz.
FIG. 6B is an explanation view schematically illustrating the state where each image illustrated in FIG. 6A is displayed in the second drive mode.
Figures 7A, 7B:
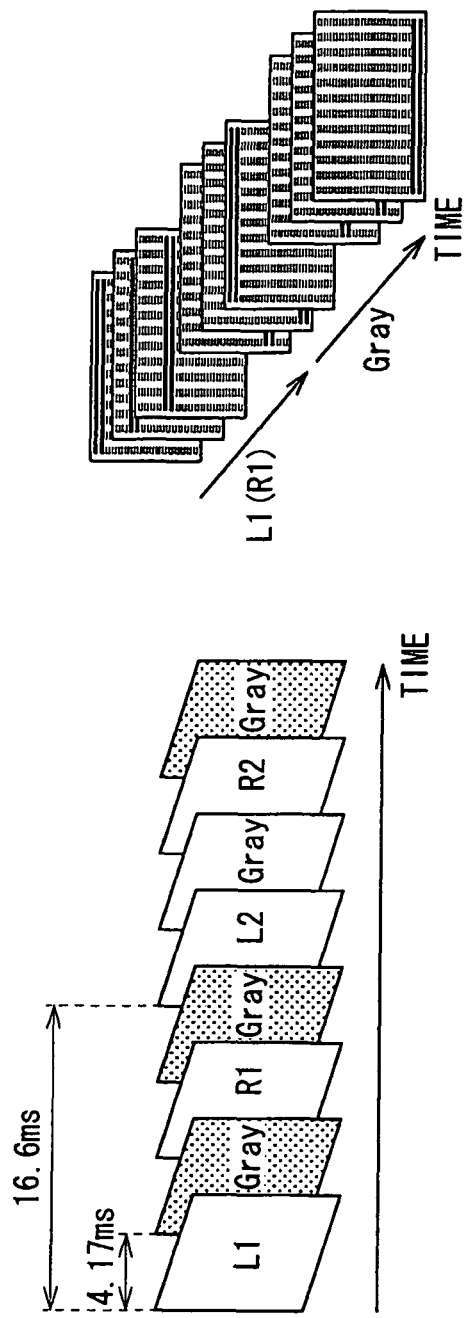
FIG. 7A is an explanation view schematically illustrating the state where the three dimensional image alternately includes the image for the left eye, the image for the right eye, and a gray image in the frame frequency period of 60 Hz.
FIG. 7B is an explanation view schematically illustrating the state where each image illustrated in FIG. 7A is displayed in the second drive mode.

The data processing circuit 12 converts, for example, the input images as illustrated in FIG. 5A into the image data as illustrated in FIG. 6A or FIG. 7A. In FIG. 6A, the input images of FIG. 5A are converted into the images in which the same parallax images are consecutively arranged by two in the frame frequency period of 60 Hz (16.6 ms). In this case, each parallax image is updated at 240 Hz (4.17 ms). In FIG. 7A, the input images of FIG. 5A are converted into the images in which the gray images Gr are inserted between the parallax images of left and right. In this case, each parallax image and the gray image Gr are updated at 240 Hz (4.17 ms). In the case where the image having the frame structure as illustrated in FIGS. 6A and 7A is displayed, the timing controller 10 drives the display panel 40 in the second drive mode. In other words, as illustrated in FIGS. 6B and 7B, the display panel 40 is consecutively scanned by two horizontal lines, thereby performing the display.

The color correcting circuit 14 corrects a color gamma characteristic. The second memory controller 16 controls writing and reading of the image information between the overdrive circuit 15 and the second frame buffer 23. The overdrive circuit 15 performs the signal conversion in accordance with the combined information of the frame-delayed image through the second frame buffer 23, and the undelayed image from the color correcting circuit 14.

The timing generator circuit section 17 converts the image signal from the overdrive circuit 15 into the signal for driving the display panel 40, and supplies the signal to the source driver 41 and the gate driver 42. The data formatter converts an image data array in accordance with a transmission system of the source driver 41. The transmitting section 20 performs the signal transmission in accordance with the transmission system of the source driver 41. The control signal generating section 18 supplies the control signal to the source driver 41 and the gate driver 42. To the gate driver 42, the control signal generating section 18 supplies a gate driver control signal for scanning the horizontal line on the display panel 40. As the drive signals, the signal in response to the image data of RGB is input to the source driver 41 through the transmitting section 20, and a source driver control signal is input from the control signal generating section 18 to the source driver 41. The source driver control signal is a signal controlling the polarity and the level conversion of the potential with which the writing is performed on each pixel of the display panel 40.

(Operation in First Drive Mode)

In this image display device, in the first drive mode, the combination of the sub-pixel electrodes as illustrated in FIGS. 2 and 4A is used to perform the display. In other words, the first sub-pixel electrode (for example, 1A), and the second sub-pixel electrode (for example, 1B) arranged adjacent to each other in the horizontal direction along the same gate line (for example, G1), and arranged on the two different source lines (for example, S1 and S2) are driven based on gray scale values different from each other. The combination of the first sub-pixel electrode 1A and the second sub-pixel electrode 1B is treated as a single pixel, and the display drive is performed.

Figure 8:
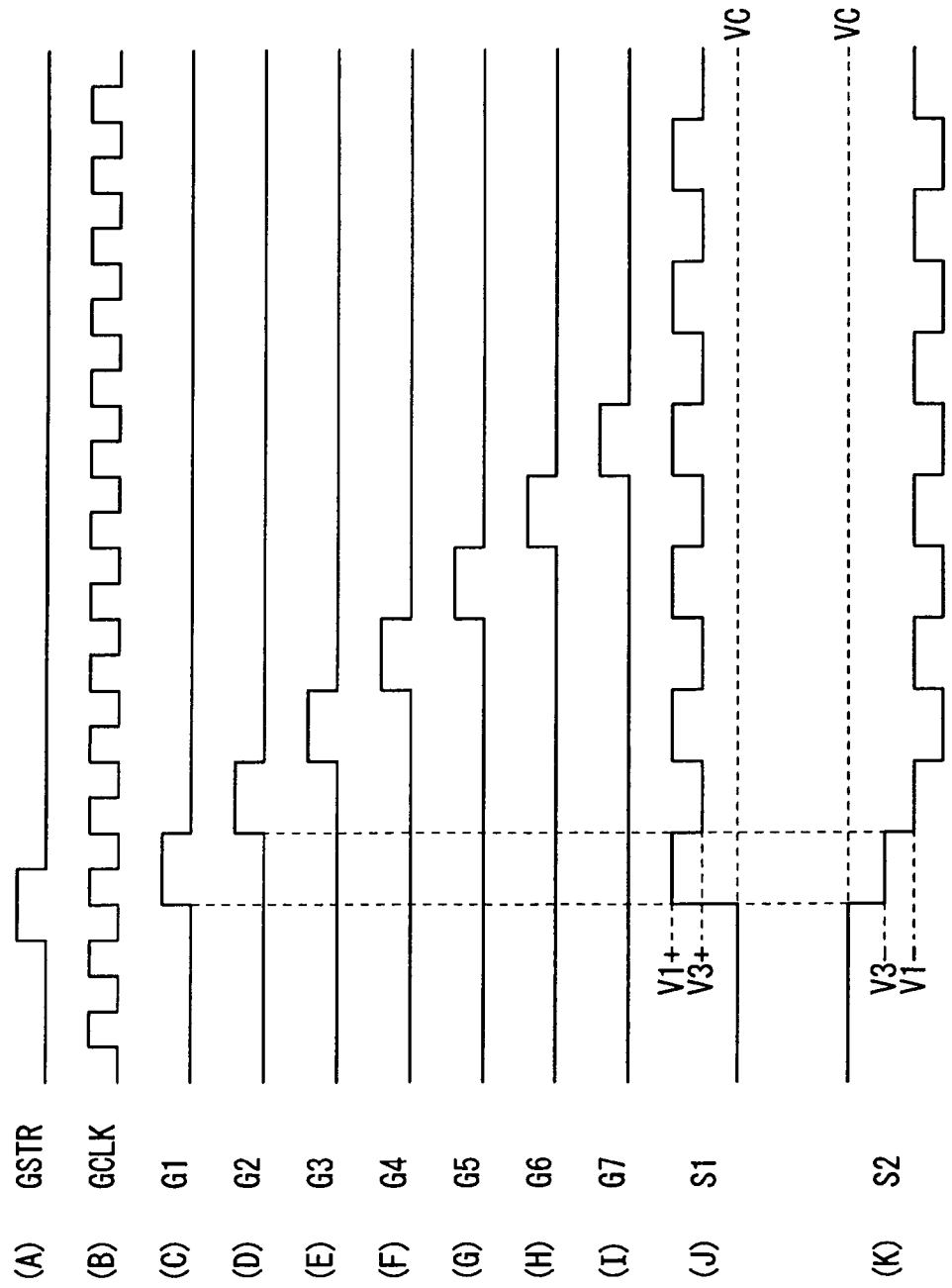
FIG. 8 is a timing chart illustrating waveforms of various drive signals in the case where the display is performed in the first drive mode in the image display device according to the first embodiment.

Part A to Part K of FIG. 8 illustrate waveforms of various drive signals in the case where the display is performed in the first drive mode. In Part A to Part K of FIG. 8, the case where the image is displayed at the uniform luminance is exemplified. Part A of FIG. 8 illustrates an example of the waveform of a start timing signal GSTR of the horizontal scanning. Part B of FIG. 8 illustrates an example of the waveform of a reference clock signal GCLK of the horizontal scanning. Part C to Part I of FIG. 8 illustrate examples of the waveforms of the scanning signals applied to the first gate line G1 to the seventh gate line G7. Part J of FIG. 8 illustrates an example of the waveform of the image signal applied to the first source line S1. Part K of FIG. 8 illustrates an example of the waveform of the image signal applied to the second source line S2.

In the first drive mode, as illustrated in Part C to Part I of FIG. 8, each gate line is scanned by one line. When the first gate line G1 is scanned, as illustrated in Part J of FIG. 8, a potential of V1+ (a potential whose absolute value to the common potential VC is V1 on a plus side) is applied to the first source line S1. At the same time, as illustrated in Part K of FIG. 8, a potential of V3− (a potential whose absolute value to the common potential VC is V3 on a minus side) is applied to the second source line S2. The absolute value V3 is set to be a value smaller than the absolute value V1. In this case, for example, the potential of V1+ is applied to the first sub-pixel electrode 1A in FIG. 2, and the potential of V3− is applied to the second sub-pixel electrode 1B. Therefore, the half tone drive in which the first sub-pixel electrode 1A and the second sub-pixel electrode 1B constituting one pixel as a whole are driven based on the gray scale values different from each other is performed, and the effect of improving the viewing angle characteristic of the gray scale is obtained.

(Operation in Second Drive Mode)

Figure 3:
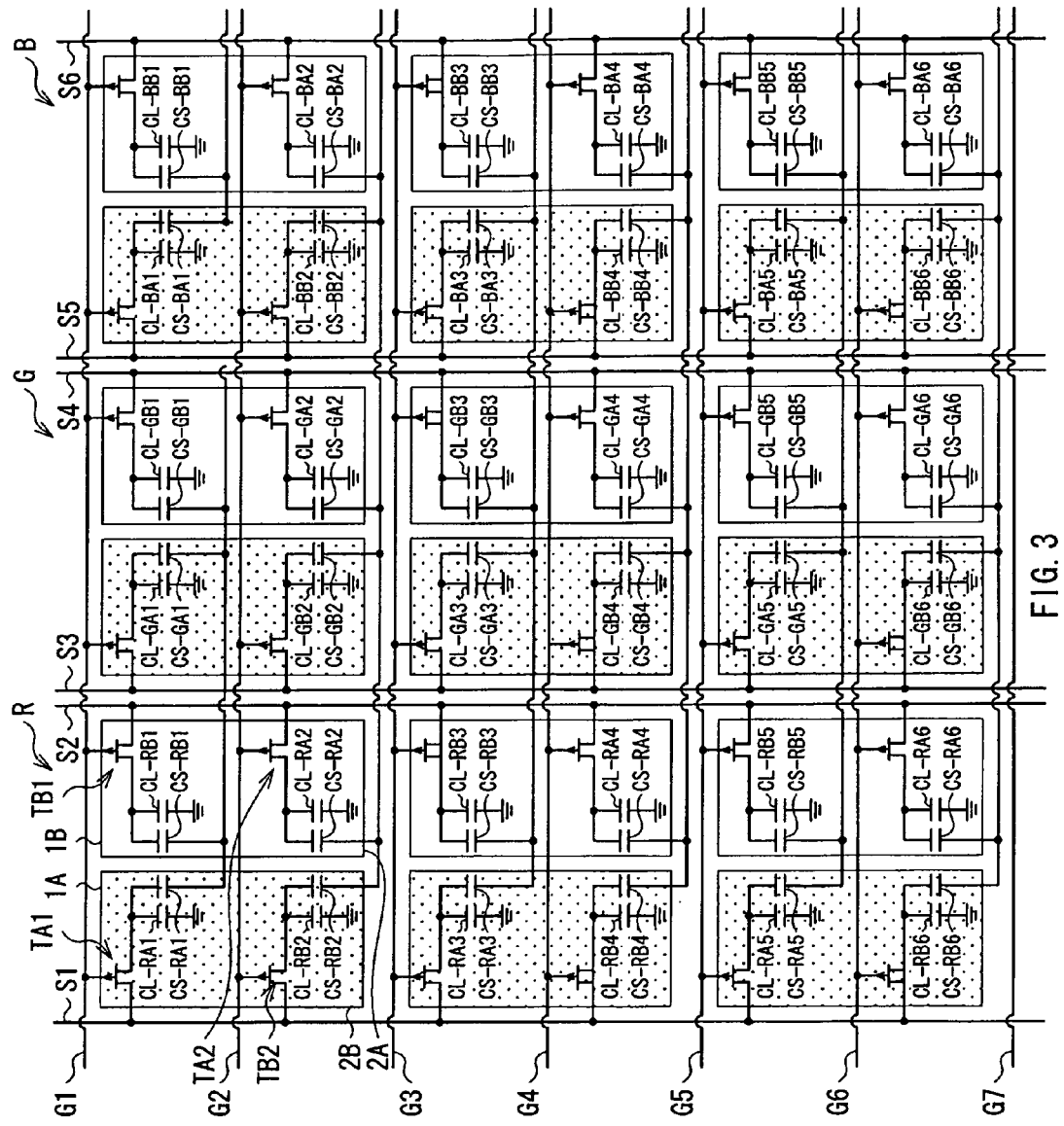
FIG. 3 is a structural view schematically illustrating a combination example of the sub-pixel electrodes in the case where a quasi double speed drive (second drive mode) is performed in the image display device according to the first embodiment.
Figure 4B:
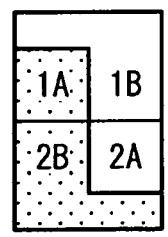
FIG. 4B is an explanation view illustrating the combination example of the sub-pixel electrodes in the second drive mode.

In this image display device, in the second drive mode, the combination of the sub-pixel electrodes as illustrated in FIGS. 3 and 4B is used to perform the display. In the second drive mode, the plurality of gate lines G1, G2, G3 . . . are sequentially selected by two lines at the same time to scan the plurality of sub-pixel electrodes by two horizontal lines. Further, the first sub-pixel electrode and the second sub-pixel electrode arranged adjacent to each other in the vertical direction on the same source line, and arranged on the two different gate lines are treated as a single pixel, and the display drive is performed. For example, as illustrated in FIG. 3, the first sub-pixel electrode 1A and the other second sub-pixel electrode 2B which are connected to the first source line S1 are treated as a single pixel, and the display drive is performed. Further, for example, as illustrated in FIG. 3, the second sub-pixel electrode 1B and the other first sub-pixel electrode 2A which are connected to the second source line S2 are treated as a single pixel, and the display drive is performed.

Here, in the combination of the sub-pixel electrodes treated as a single pixel in the first drive mode, the combination of the first sub-pixel electrode 1A and the second sub-pixel electrode 1B is treated as a first pixel, and the combination of the other first sub-pixel electrode 2A and the other second sub-pixel electrode 2B is treated as a second pixel. Meanwhile, in the second drive mode, when the first gate line G1 and the second gate line G2 are selected at the same time, consideration is given to each of the sub-pixel electrodes arranged at the intersections of the first gate line G1 and the second gate line G2, and the first source line S1 and the second source line S2. In the second drive mode, the second sub-pixel electrode 1B on the first gate line G1 and the other first sub-pixel electrode 2A on the second gate line G2 correspond to the first pixel in the first drive mode. Further, the first sub-pixel electrode 1A on the first gate line G1 and the other second sub-pixel electrode 2B on the second gate line G2 correspond to the second pixel in the first drive mode.

Figure 9:
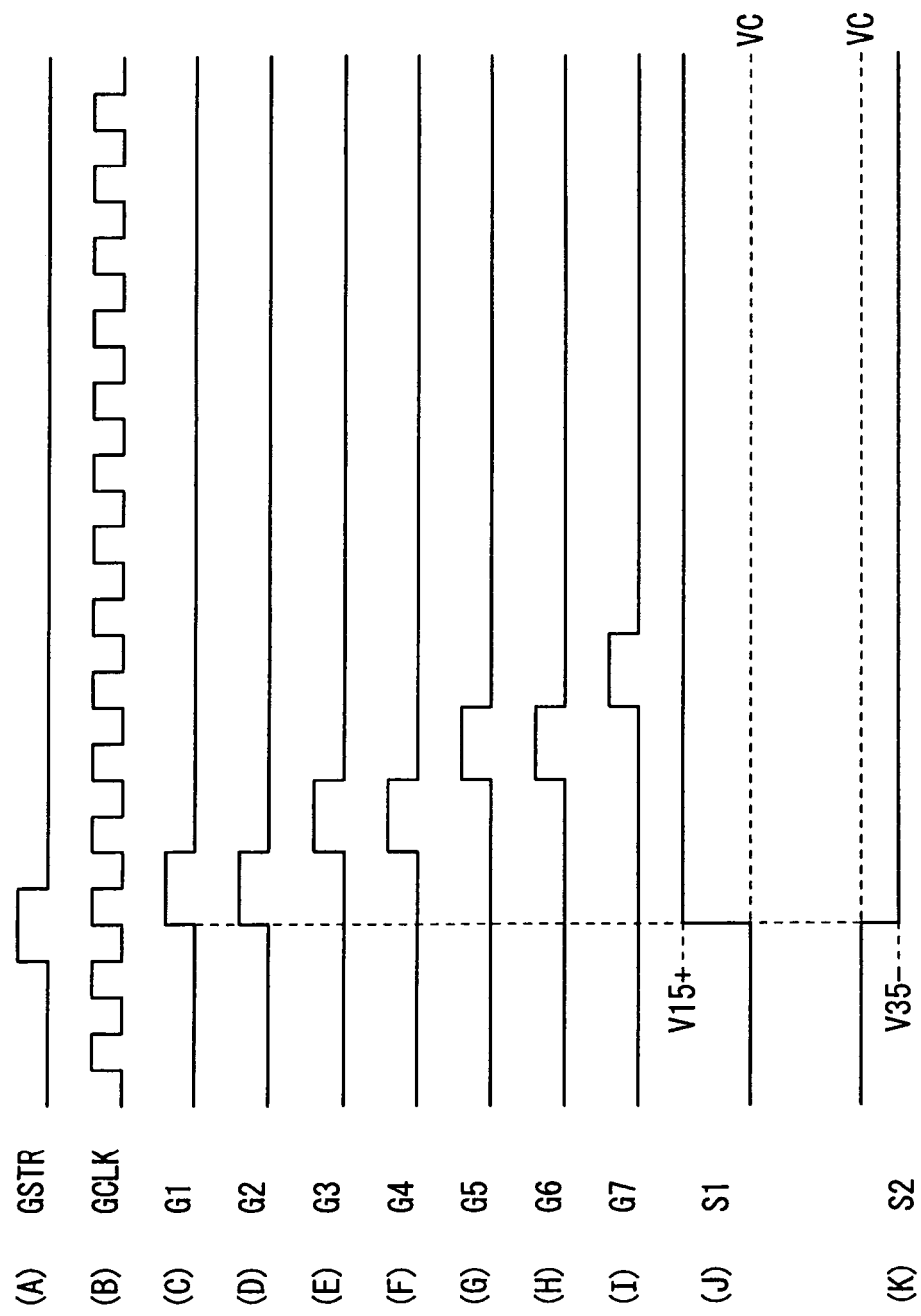
FIG. 9 is a timing chart illustrating the waveforms of the various drive signals in the case where the display is performed in the second drive mode in the image display device according to the first embodiment.

Part A to Part K of FIG. 9 illustrate the waveforms of the various drive signals in the case where the display is performed in the second drive mode. Part A of FIG. 9 illustrates an example of the waveform of the start timing signal GSTR of the horizontal scanning. Part B of FIG. 9 illustrates an example of the waveform of the reference clock signal GCLK of the horizontal scanning. Part C to Part I of FIG. 9 illustrate examples of the waveforms of the scanning signals applied to the first gate line G1 to the seventh gate line G7. Part J of FIG. 9 illustrates an example of the waveform of the image signal applied to the first source line S1. Part K of FIG. 9 illustrates an example of the waveform of the image signal applied to the second source line S2.

In the second drive mode, as illustrated in Part C to Part I of FIG. 9, each gate line is scanned by two lines. As illustrated in Part J of FIG. 9, a potential of V15+ (a potential whose absolute value to the common potential VC is V15 on the plus side) is applied to the first source line S1. At the same time, as illustrated in Part K of FIG. 9, a potential of V35− (a potential whose absolute value to the common potential VC is V35 on the minus side) is applied to the second source line S2. The absolute value V35 is set to be a value smaller than the absolute value V15. Therefore, the pixel data corresponding to one pixel is written on the two sub-pixel electrodes in the vertical direction.

As described above, according to this embodiment, in the second drive mode, since the plurality of gate lines are sequentially selected by two lines at the same time to scan the plurality of sub-pixel electrodes by two horizontal lines, it may be possible to obtain the drive speed twice the drive speed of the first drive mode. Therefore, for example, in the case where the display panel 40 has the drive performance at a frame frequency of 120 Hz, the quasi drive at the frame frequency of 240 Hz may be performed.

In this embodiment, in particular, in the second drive mode, the two sub-pixel electrodes arranged adjacent to each other in the vertical direction on the same source line are treated as a single pixel, and the display drive is performed. Therefore, although the half tone drive as in the first drive mode may not be performed, it may be possible to obtain the drive speed twice the drive speed of the first drive mode, without reducing the display resolution.

2. Second Embodiment

Next, the image display device according to a second embodiment of the present invention will be described. In addition, the same reference numerals will be used to indicate components substantially identical to those in the image display device according to the first embodiment, and therefore the description is appropriately omitted.

In the image display device according to this embodiment, the operation in the second drive mode is different from that of the first embodiment. The basic pixel structure (FIG. 2) of the display panel 40, and the operation in the first drive mode (FIG. 8) are the same as those of the first embodiment.

Figure 10:
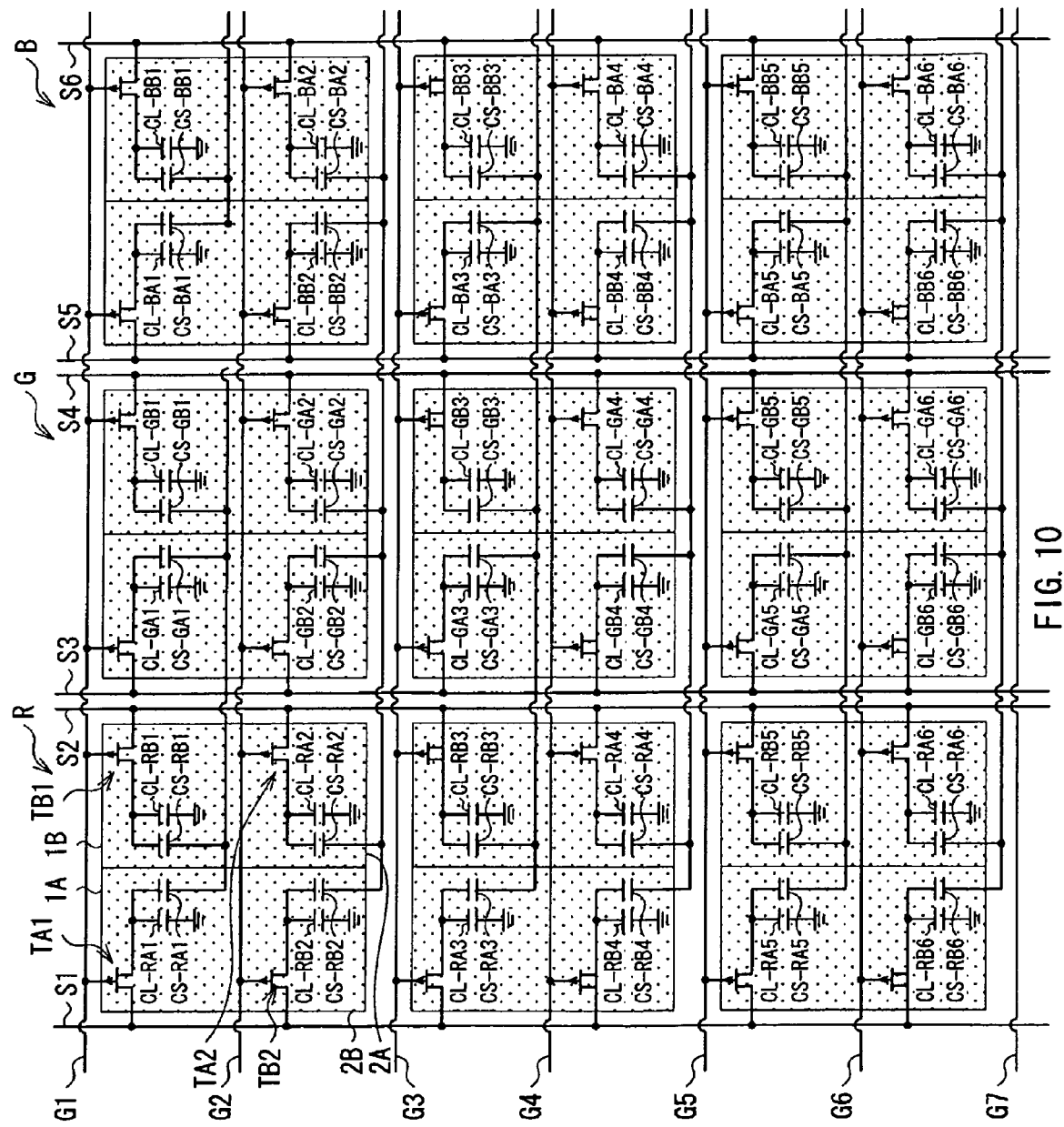
FIG. 10 is a structural view schematically illustrating a combination example of the sub-pixel electrodes in the case where the display is performed in the second drive mode in an image display device according to a second embodiment.

In this image display device, in the second drive mode, the combination of the sub-pixel electrodes as illustrated in FIG. 10 is used to perform the display. In the second drive mode, the plurality of gate lines G1, G2, G3 . . . are sequentially selected by two lines at the same time to scan the plurality of sub-pixel electrodes by two horizontal lines. Further, in the second drive mode, the combination of the four sub-pixel electrodes arranged in the intersections of the two source lines adjacent to each other and the two gate lines adjacent to each other are treated as a single pixel, and the display drive is performed. For example, the two sub-pixel electrodes 1A and 2B consecutively arranged in the vertical direction on the first source line S1, and the two sub-pixel electrodes 1B and 2A consecutively arranged in the vertical direction on the second source line S2 which is adjacent to the first source line S1 are combined and treated as a single pixel, and the display drive is performed.

Figure 11:
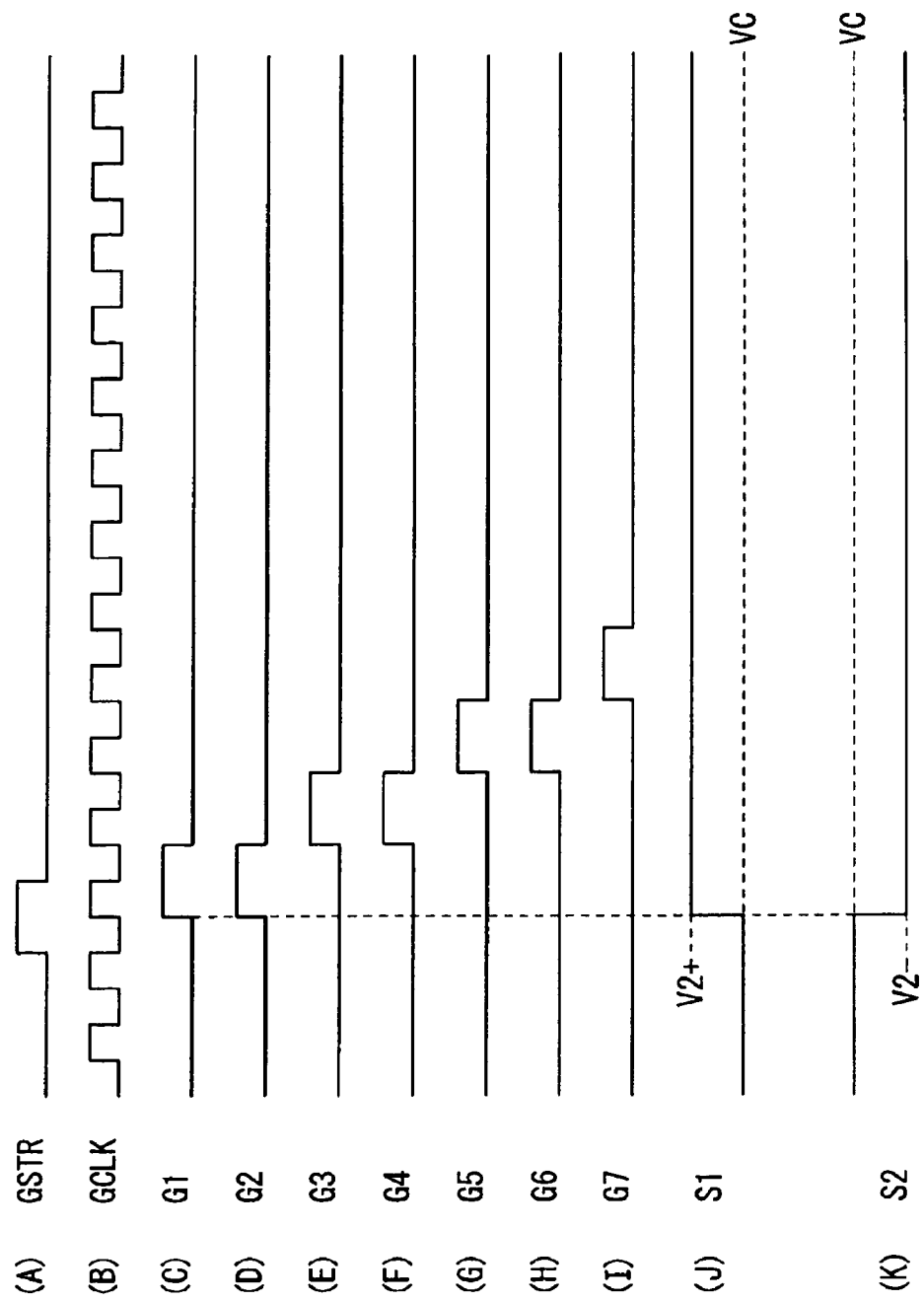
FIG. 11 is a timing chart illustrating the waveforms of the various drive signals in the case where the display is performed in the second drive mode in the image display device according to the second embodiment.

In this embodiment, Part A to Part K of FIG. 11 illustrate waveforms of various drive signals in the case where the display is performed in the second drive mode. Part A of FIG. 11 illustrates an example of the waveform of the start timing signal GSTR of the horizontal scanning. Part B of FIG. 11 illustrates an example of the waveform of the reference clock signal GCLK of the horizontal scanning. Part C to Part I of FIG. 11 illustrate examples of the waveforms of the scanning signals applied to the first gate line G1 to the seventh gate line G7. Part J of FIG. 11 illustrates an example of the waveform of the image signal applied to the first source line S1. Part K of FIG. 11 illustrates an example of the waveform of the image signal applied to the second source line S2.

In the second drive mode, as illustrated in Part C to Part I of FIG. 11, each gate line is scanned by two lines. As illustrated in Part J of FIG. 11, a potential of V2+ (a potential whose absolute value to the common potential VC is V2 on the plus side) is applied to the first source line S1. At the same time, as illustrated in Part K of FIG. 11, a potential of V2− (a potential whose absolute value to the common potential VC is V2 on the minus side) is applied to the second source line S2. In other words, the potentials whose absolute values are V2, and which are substantially the same as each other as the pixel data are applied to the first source line S1 and the second source line S2. Therefore, the pixel data corresponding to one pixel is written on a total of the four sub-pixel electrodes adjacent to each other in the vertical direction and the horizontal direction.

In this embodiment, since the first source line S1 and the second source line S2 are driven with the same image information, in the circuit of FIG. 1, the first frame buffer 21 may store only the information on the line side to be used for the drive. In other words, in the second drive mode, the image signal is generated by data-thinning of one horizontal line from every two horizontal lines in the input image signal, and the display panel is driven based on the image signal after data-thinning. Therefore, there is room in a signal bandwidth, and it may be possible to improve, for example, the performance of the overdrive circuit 15. It t is possible to reduce the drive lord by transmitting data between the circuits at a low speed. Further, although the display resolution is reduced, it may be possible to obtain the drive speed twice the drive speed of the first drive mode.

3. Third Embodiment

Next, the image display device according to a third embodiment of the present invention will be described. In addition, the same reference numerals will be used to indicate components substantially identical to those in the image display devices according to the first embodiment and the second embodiment, and therefore the description is appropriately omitted.

Figure 12:
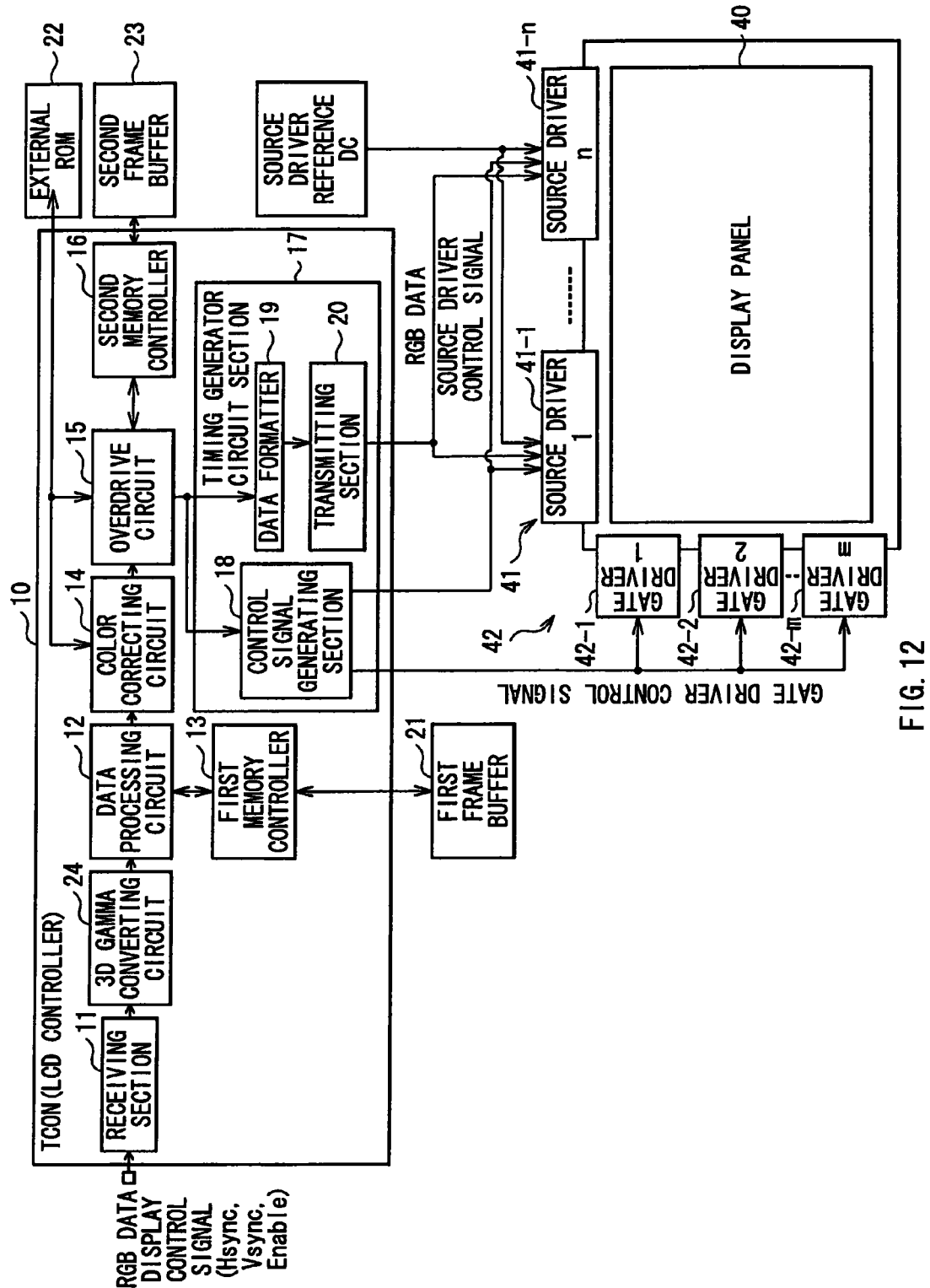
FIG. 12 is a block diagram illustrating the circuit structure of an image display derive according to a third embodiment.

FIG. 12 is a block diagram illustrating the overall structure of the image display device according to this embodiment. The circuit structure of this image display device is the same as the circuit structure of FIG. 1 except that a 3D gamma converting circuit 24 is provided between the receiving section 11 and the data processing circuit 12 in a timing controller 10A. In this embodiment, the drive is performed so that the gray scale values in the sub-pixel electrodes treated as a single pixel in the first drive mode, and the gray scale values in the sub-pixel electrodes treated as a single pixel in the second drive mode are different from each other. The 3D gamma converting circuit 24 converts the gamma characteristic in the second drive mode.

FIG. 13 is a block diagram illustrating a first structural example of the 3D gamma converting circuit 24. The 3D gamma converting circuit 24 according to this first structural example is composed of an LUT (ODD) 31, an LUT (EVN) 32, a first selector 33, and a second selector 34. The LUT (ODD) 31 is an LUT (look-up table) storing gamma table data of the pixels of odd lines (the source lines S1, S3, S5 . . . ) in the vertical direction. The LUT (EVN) 32 is a look-up table storing the gamma table data of the pixels of even lines (the source lines S2, S4, S6 . . . ) in the vertical direction. The first selector 33 selects and outputs the output data level-converted by the LUT (ODD) 31 and the LUT (EVN) 32 in accordance with parities of the lines. The second selector 34 outputs the input data as it is in the first drive mode, and selectively outputs the converted data input through the first selector 33 in the second drive mode.

Figure 14:
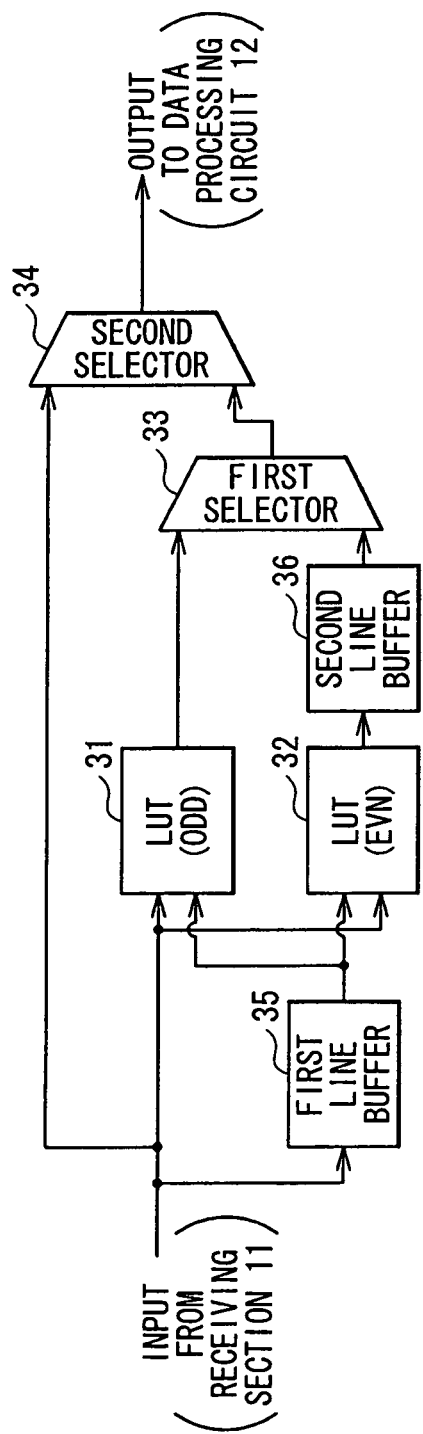
FIG. 14 is a block diagram illustrating a second structural example of the 3D gamma converting circuit in the image display device according to the third embodiment.

FIG. 14 is a block diagram illustrating a second structural example of the 3D gamma converting circuit 24. The second structural example further includes a first line buffer 35, and a second line buffer 36, in addition to the components in the first structural example of FIG. 13. In this second structural example, by providing the first line buffer 35, the line delay is generated, and the image data of two lines is input to the LUT (ODD) 31 and the LUT (EVN) 32, respectively. In the second structural example, each of the LUT (ODD) 31 and the LUT (EVN) 32 includes a two-dimensionally arranged look-up table for calculating correction values from a correlation between two pixels. In the second structural example, since the correction values for the pixels of the two lines are generated at the same time, the video signal is converted by line-delaying the data of the latter line data, and outputting the data to a signal processing block of the subsequent stage by the second line buffer 36.

By using the 3D gamma converting circuit 24 in this second structural example, in the second drive mode, the signal level of the drive signal applied to the first sub-pixel electrode and the second sub-pixel electrode treated as a single pixel is determined based on the pixel data of the two pixels arranged adjacent to each other in the vertical direction on a first horizontal pixel line and a second horizontal pixel line which are adjacent to each other in the input image signal. That drive signal is input to the first sub-pixel electrode and the second sub-pixel electrode through one source line by the drive circuit of the subsequent stage.

Figure 15:
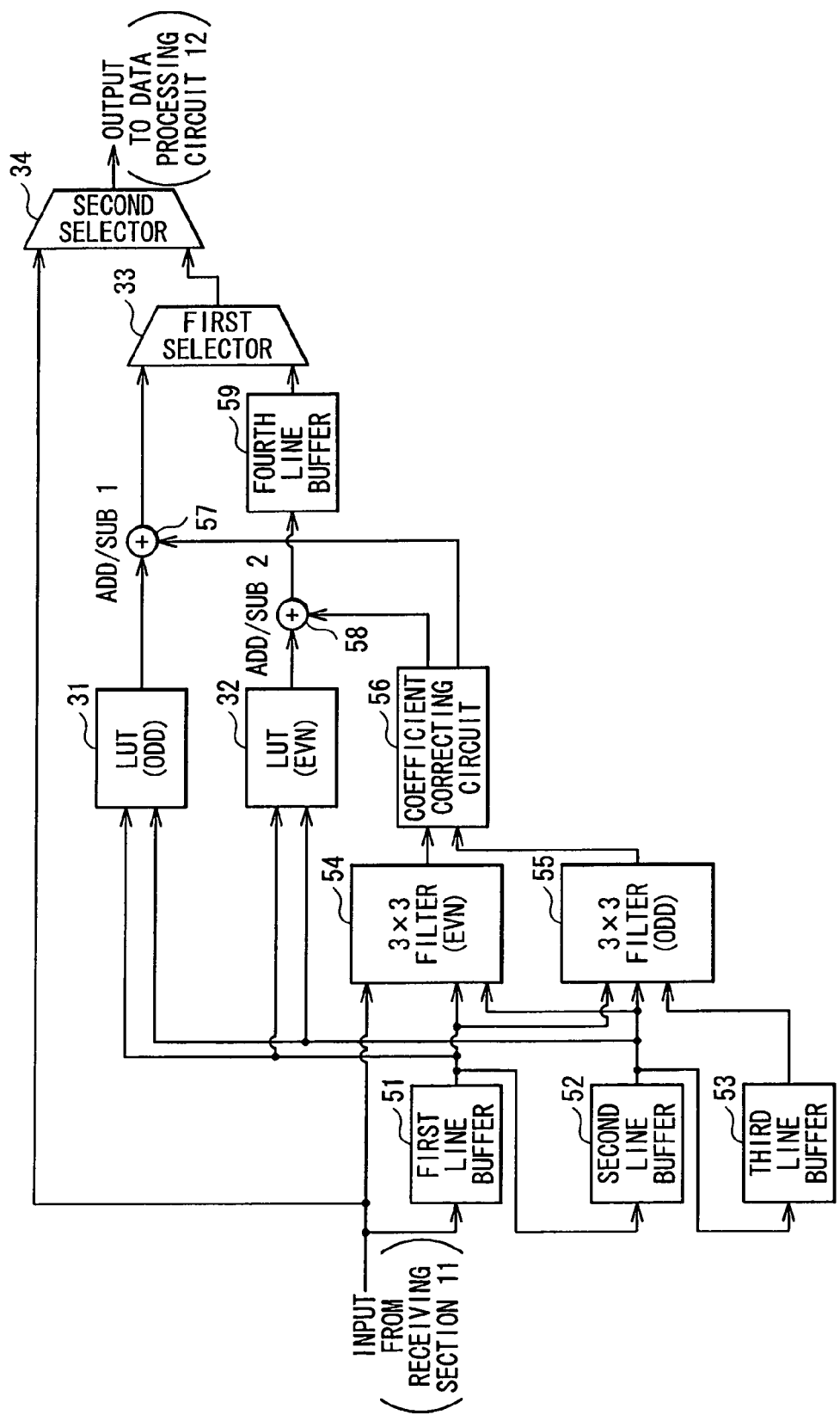
FIG. 15 is a block diagram illustrating a third structural example of the 3D gamma converting circuit in the image display device according to the third embodiment.

FIG. 15 is a block diagram illustrating a third structural example of the 3D gamma converting circuit 24. In this third structural example, the functions of the second structural example of FIG. 14 are further expanded. In addition to the components of the first structure example of FIG. 13, the third structural example further includes a first line buffer 51, a second line buffer 52, a third line buffer 53, a 3×3 filter (EVN) 54, a 3×3 filter (ODD) 55, a coefficient correcting circuit 56, a first adding/subtracting circuit 57, a second adding/subtracting circuit 58, and a fourth line buffer 59. The first line buffer 51, the second line buffer 52, and the third line buffer 53 are intended to generate delay of three horizontal lines to the input image signal. Therefore, the data of the upper line and the lower line of each pixel to be processed arranged on the odd line and the even line in the vertical direction may be generated, and it may be possible to obtain a pixel data string of the three lines including the pixel to be processed. That pixel data of the three lines is input to the 3×3 filter (EVN) 54 and the 3×3 filter (ODD) 55. Each of the 3×3 filter (EVN) 54 and the 3×3 filter (ODD) 55 internally includes a dot delay element, generates delay of the three horizontal lines, forms the 3×3 pixel data, and generates a filter coefficient by multiplying an operator corresponding to the 3×3 pixel data by the 3×3 pixel data. The coefficient correcting circuit 56 adjusts the generated filter coefficient. The first adding/subtracting circuit 57 adds/subtracts the filter coefficient to/from the correction value which is obtained from the correlation between the two pixels and is output from the LUT (ODD) 31. The second adding/subtracting circuit 58 adds/subtracts the filter coefficient to/from the correction value which is obtained from the correlation between the two pixels and is output from the LUD (EVN) 32. The fourth line buffer 59 has the same functions as the second line buffer 36 in the second structural example, and line-delays the line data of the even number line.

By using the 3D gamma converting circuit 24 of the third structural example, in the second drive mode, the signal level of the drive signal applied to the first sub-pixel electrode and the second sub-pixel electrode treated as a single pixel is determined based on the correlation between the pixel data of the two pixels arranged adjacent to each other in the vertical direction on the first horizontal pixel line and the second horizontal pixel line which are adjacent to each other in the input image signal, and the pixel data of the plurality of other pixels located in the vicinity of the two pixels. That drive signal is input to the first sub-pixel electrode and the second sub-pixel electrode through one source line by the drive circuit of the subsequent stage.

Figure 16:
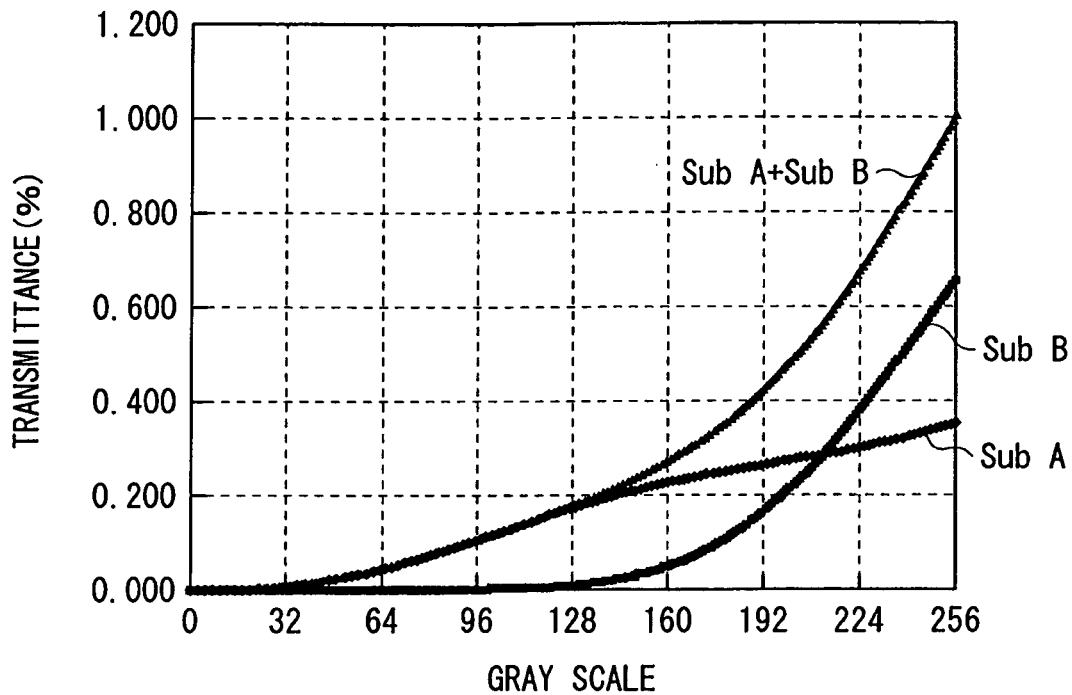
FIG. 16 is a characteristic view illustrating a gray scale-transmittance characteristic in each of the sub-pixel electrodes in the pixel structure illustrated in FIG. 2.
Figure 17:
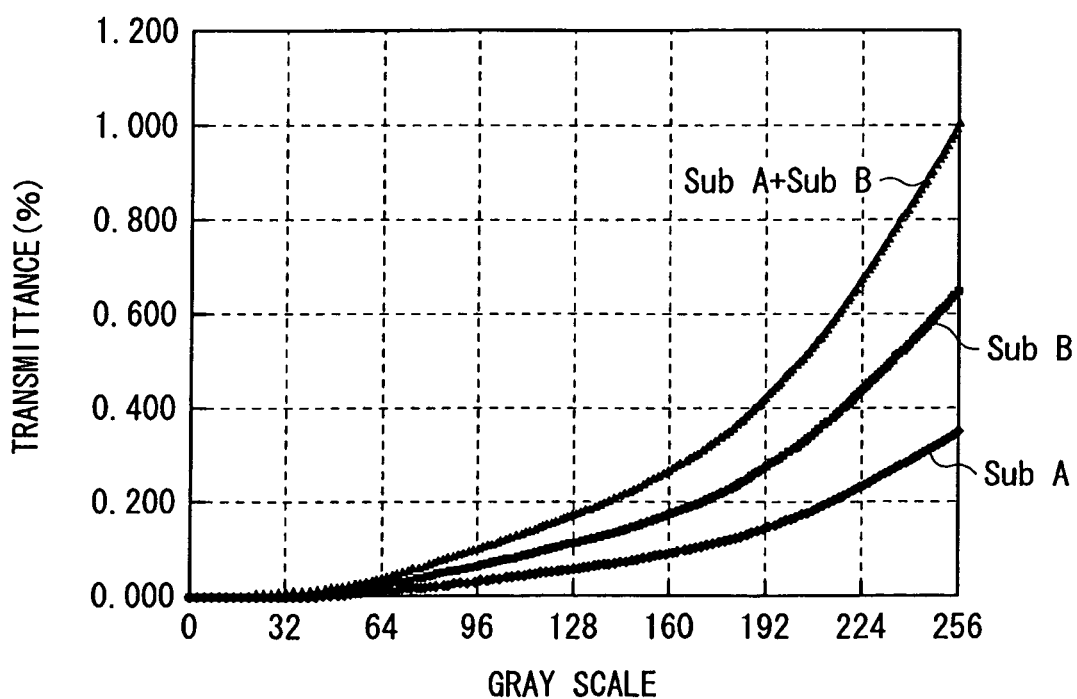
FIG. 17 is a characteristic view illustrating the gray scale-transmittance characteristic in each of the sub-pixel electrodes in the pixel structure illustrated in FIG. 10.

FIG. 16 is a characteristic view illustrating the gray scale-transmittance characteristic in each sub pixel electrode in the pixel structure illustrated in FIG. 2 (the first drive mode). FIG. 17 is a characteristic view illustrating the gray scale-transmittance characteristic in each sub pixel electrode in the pixel structure illustrated in FIG. 10 (the second drive mode). The display panel 40 has the gray scale-transmittance characteristic (gamma characteristic) for each sub-pixel electrode, and the characteristic of the first sub-pixel electrode A (Sub A), and the characteristic of the second sub-pixel electrode B (Sub B) are added to obtain the gamma characteristic (Sub A+Sub B) of one pixel.

In the first drive mode, as illustrated in FIG. 16, the drive is performed with the gamma characteristic of the first sub-pixel electrode A and the gamma characteristic of the second sub-pixel electrode B different from each other. To preferably avoid the state of the transmittance that the viewing angle characteristic is poor in the low gray scale, the gamma characteristic is as illustrated in FIG. 16. In the second drive mode, as illustrated in FIG. 17, the gamma characteristics of the first sub-pixel electrode A and the second sub-pixel electrode B are obtained by multiplying an area ratio of each sub-pixel electrode by the predetermined synthesis gamma characteristic (Sub A+Sub B).

4. Fourth Embodiment

Next, the image display device according to a fourth embodiment of the present invention will be described. In addition, the same reference numerals will be used to indicate components substantially identical to those in the image display devices according to the first embodiment to the third embodiment, and therefore the description is appropriately omitted.

In the image display device according to this embodiment, the operation in the second drive mode is different from that of the first embodiment. Further, the basic pixel structure (FIG. 2) of the display panel 40 is different.

Figure 18:
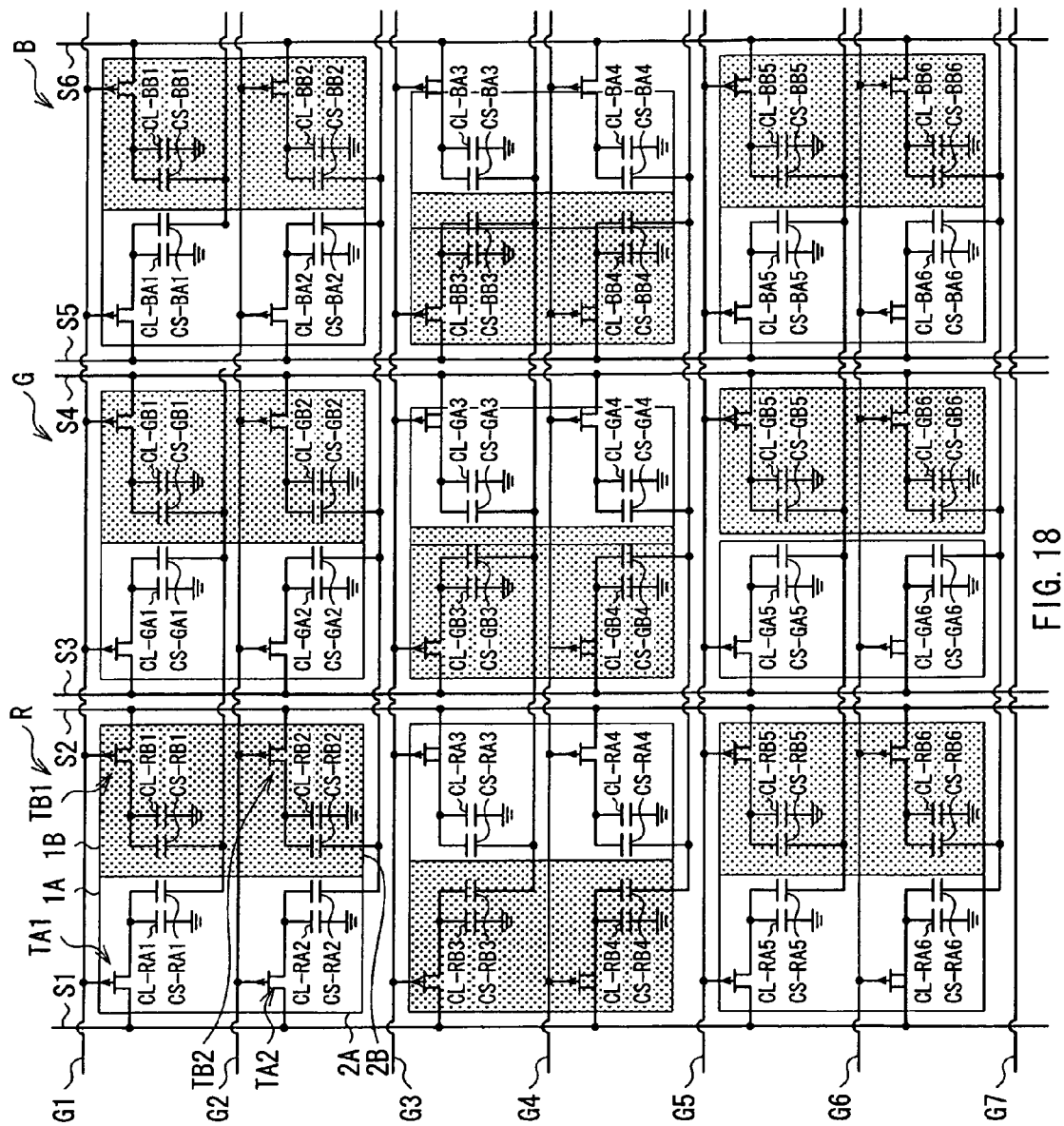
FIG. 18 is a structural view schematically illustrating a combination example of the sub-pixel electrodes in the case where the display is performed in the second drive mode in an image display device according to a fourth embodiment.

In this image display device, in the second drive mode, the display is performed by using the combination of the sub-pixel electrodes as illustrated in FIG. 18. In this embodiment, in the display panel 40, the two types of sub-pixel electrodes are alternately arranged in the horizontal direction, and the same type of sub-pixel electrodes periodically appear by two lines in the vertical direction. For example, in the pixel located at the upper left in FIG. 18, the two sub-pixel electrodes 1A and 2A in the vertical direction are the first sub-pixel electrodes. Further, the other two sub-pixel electrodes 1B and 2B adjacent to the two sub-pixel electrodes 1A and 2A in the vertical direction are the second sub-pixel electrodes.

In this embodiment, although the period that the sub-pixel electrodes appear in the vertical direction is different from the case of FIG. 2, in the first drive mode, since the scanning is performed by one horizontal line, the basic operation is the same as those of the first embodiment. Also in this embodiment, in the first drive mode, the half tone drive is performed in such a manner that the two sub-pixel electrodes (for example, the sub-pixel electrodes 1A and 1B) in the horizontal direction constituting one pixel as a whole are driven based on the gray scale values different from each other, and it may be possible to obtain the effect of improving the viewing angle characteristic of the gray scale.

In the second drive mode, the plurality of gate lines G1, G2, G3 . . . are sequentially selected by two lines at the same time to scan the plurality of sub-pixel electrodes by two horizontal lines. Further, the first sub-pixel electrode and the second sub-pixel electrode adjacent to each other in the vertical direction on the same source line, and arranged on the two different gate lines are treated as a unit pixel to be driven, and the display drive is performed. For example, as illustrated in FIG. 18, the first sub-pixel electrode 1A and the other first sub-pixel electrode 2A connected to the first source line S1 are treated as a first unit pixel to be driven, and the display drive is performed. Further, for example, the second sub-pixel electrode 1B and the other second sub-pixel electrode 2B connected to the second source line S2 are treated as a second unit pixel to be driven, and the display drive is performed. In this case, the pixel electrode of the first unit pixel to be driven and the pixel electrode of the second unit pixel to be driven are driven to have the gray scale values different from each other in the horizontal direction. The pixel electrode of the first unit pixel to be driven and the pixel electrode of the second unit pixel to be driven are combined in the horizontal direction, and treated as a single pixel to perform the display drive.

Figure 19:
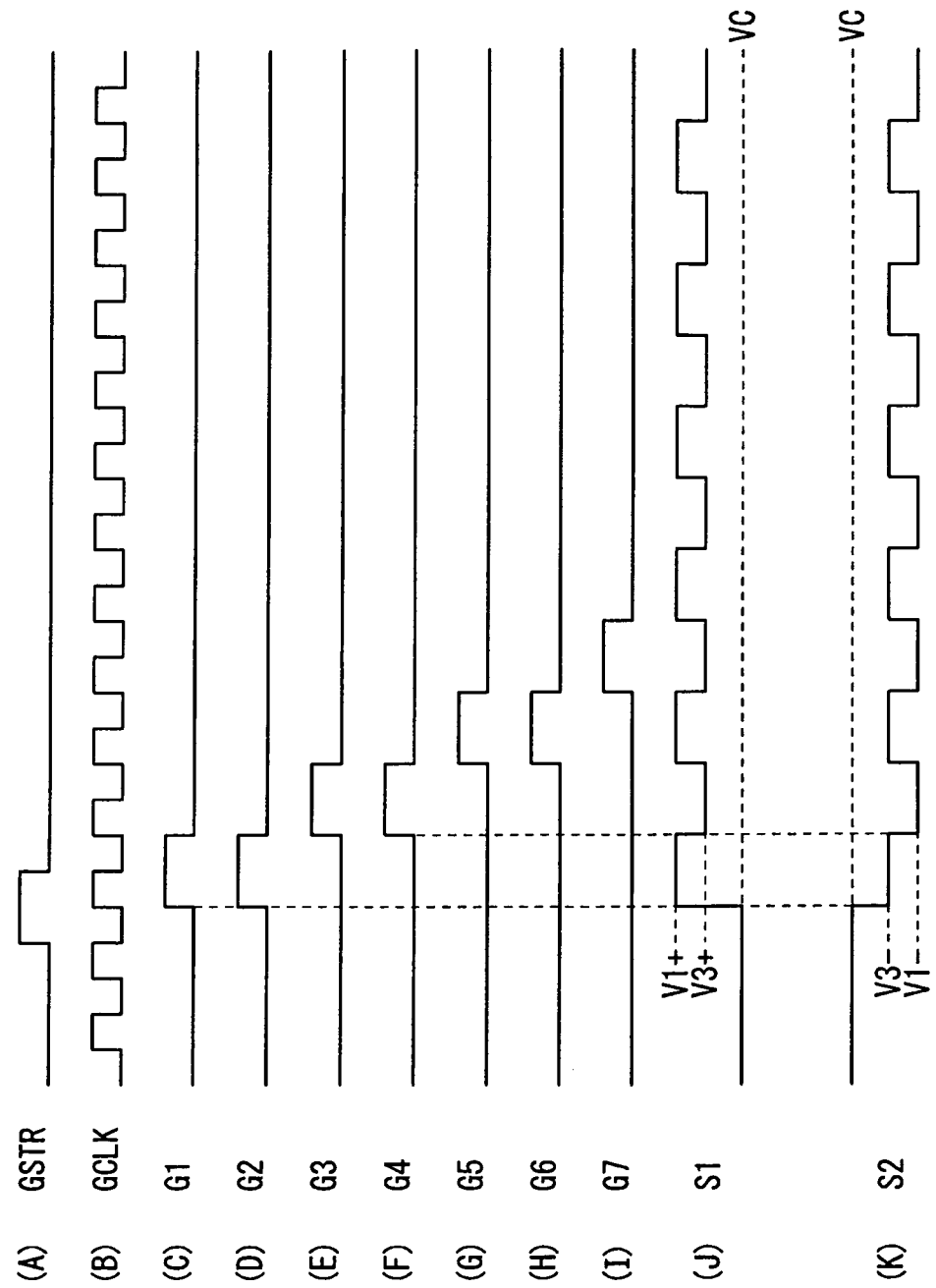
FIG. 19 is a timing chart illustrating the waveforms of the various drive signals in the case where the display is performed in the second drive mode in the image display device according to the fourth embodiment.

Part A to Part K of FIG. 19 illustrate the waveforms of the various drive signals in the case where the display is performed in the second drive mode. Part A of FIG. 19 illustrates an example of the waveform of the start timing signal GSTR of the horizontal scanning. Part B of FIG. 19 illustrates an example of the waveform of the reference clock signal GCLK of the horizontal scanning. Part C to Part I of FIG. 19 illustrate examples of the waveforms of the scanning signals applied to the first gate line G1 to the seventh gate line G7. Part J of FIG. 19 illustrates an example of the waveform of the image signal applied to the first source line S1. Part K of FIG. 19 illustrates an example of the waveform of the image signal applied to the second source line S2.

In the second drive mode, as illustrated in Part C to Part I of FIG. 19, each gate line is scanned by two lines. When the first gate line G1 and the second gate line G2 are scanned, as illustrated in Part J of FIG. 19, a potential of V1+ (a potential whose absolute value to the common potential VC is V1 on the plus side) is applied to the first source line S1. At the same time, as illustrated in Part K of FIG. 19, a potential of V3− (a potential whose absolute value to the common potential VC is V3 on the minus side) is applied to the second source line S2. The absolute value V3 is set to be a value smaller than the absolute value V1. In this case, for example, the potential of V1+ is applied to the two first sub-pixel electrodes 1A and 2A in the vertical direction in FIG. 18. The potential of V3− is applied to the second sub-pixel electrodes 1B and 2B in the vertical direction.

In this embodiment, in the second drive mode, since the plurality of gate lines are sequentially selected by two lines at the same time to scan the plurality of sub-pixel electrodes by two horizontal lines, it may be possible to obtain the drive speed twice the drive speed of the first drive mode. At this time, since the two first sub-pixel electrodes 1A and 2A consecutively arranged in the vertical direction on the first source line S1, and the two second sub-pixel electrodes 1B and 2B consecutively arranged in the vertical direction on the second source line S2 are driven to have the gray scale values different from each other, it may be possible to perform the half tone drive while the drive speed is doubled. Therefore, although the display resolution is reduced, it may be possible to obtain the drive speed twice the drive speed of the first drive mode, while the effect of improving the viewing angle characteristic of the gray scale is obtained.

5. Other Embodiments

In the present invention, various modifications may be made without being limited to the foregoing embodiments. For example, in the forgoing embodiments, in the second drive mode, although the case where the plurality of gate lines are sequentially selected by two (N=2) lines at the same time to scan the plurality of sub-pixel electrodes by two horizontal lines has been described, the scanning may be sequentially performed by N=3 lines or more at the same time. For example, in the fourth embodiment (FIGS. 18 and 19), in the pixel arrangement in which the same type of sub-pixel electrodes periodically appear by three or more lines in the vertical direction, the three or more lines may be sequentially scanned at the same time.

In this case, in the second drive mode, the image signal is generated by data-thinning of (N−1) horizontal lines from every N horizontal lines in the input image signal, and the display panel is driven based on the image signal after data-thinning. In the second drive mode, the scanning of one screen may be performed in the 1/N scanning time of the first drive mode. For example, the second drive mode may be used in the case where, in one frame period, the control is performed so that the same images for the left eye are consecutively displayed N times, and the same images for the right eye are consecutively displayed N times before or after displaying the images for the left eye.

Further, in the foregoing embodiments, although the description has been made with the example where the three dimensional image time-sequentially including the image for the left eye and the image for the right eye which have the parallax therebetween is input as the input image signal, the driving method in the present invention is also applicable to signals other than the three dimensional image signal.

It should be understood by those skilled in the art that various modifications, combinations, sub-combinations and alternations may occur depending on design requirements and other factors insofar as they are within the scope of the appended claims or the equivalents thereof.

What is claimed is:

1. An image display device comprising:
a display panel including a plurality of gate lines for scanning which extend in a horizontal direction, a plurality of source lines which extend in a vertical direction to intersect the plurality of gate lines, the source lines being supplied with drive signals based on input image signals, and a plurality of sub-pixel electrodes arranged one by one in positions corresponding to intersections of the plurality of gate lines and the plurality of source lines, each of the sub-pixel electrodes being independently controlled for driving; and
a drive control section performing a drive control of the display panel by selectively using two drive modes of a first drive mode and a second drive mode, to display an image based on the input image signal on the display panel, the first drive mode allowing horizontal lines of the plurality of sub-pixel electrodes to be scanned one line at a time through sequentially selecting the plurality of gate lines one by one, and the second drive mode allowing the horizontal lines of the plurality of sub-pixel electrodes to be scanned N lines at a time through sequentially selecting the plurality of gate lines N lines at a time, where N is an integer of 2 or more,
wherein
the display panel is configured in such a manner that a first sub-pixel electrode and a second sub-pixel electrode are alternately arranged in the horizontal direction and in the vertical direction,
in the first drive mode, the drive control section performs display drive in such a manner that the first and second sub-pixel electrodes, arranged adjacent to each other in the horizontal direction along a gate line and arranged on two respective source lines, are driven based on two respective gray scale values different from each other, and that a combination of the first and second sub-pixel electrodes is treated as a single pixel, and
in the second drive mode, the drive control section performs display drive in such a manner that the horizontal lines of the plurality of sub-pixel electrodes are scanned two lines at a time through sequentially selecting the plurality of gate lines two lines at a time, and that the first and second sub-pixel electrodes, both arranged adjacent to each other in the vertical direction along a source line and arranged along two respective gate lines, are treated as a single pixel.

2. The image display device according to claim 1, wherein the second sub-pixel electrode has an area different from that of the first sub-pixel electrode.

3. The image display device according to claim 2, wherein an area of the second sub-pixel electrode is set to be larger than that of the first sub-pixel electrode, and
in the first drive mode, the drive control section performs a display drive in such a manner that a combination of the first and second sub-pixel electrodes arranged at intersections of a first gate line and first and second source lines arranged adjacent to each other is treated as a first pixel, and that a combination of another first sub-pixel electrode and another second sub-pixel electrode arranged at intersections of a second gate line arranged adjacent to the first gate line and the first and second source lines is treated as a second pixel, and
in the second drive mode, the drive control section selects the first and second gate lines at a time, to perform a display drive in such a manner that a combination of the second sub-pixel electrode along the first gate line and said another first sub-pixel electrode along the second gate line is treated as a first pixel, and a combination of the first sub-pixel electrode along the first gate line and said another second sub-pixel electrode along the second gate line is treated as a second pixel.

4. The image display device according to claim 2, wherein the drive control section performs the display drive in such a manner that gray scale data applied to the sub-pixel electrodes treated as the single pixel in the first drive mode is different from gray scale data applied to the sub-pixel electrodes treated as the single pixel in the second drive mode.

5. The image display device according to claim 2, wherein in the second drive mode, the drive control section determines signal levels of the drive signals to be applied to the respective first and second sub-pixel electrodes which are treated as the single pixel, based on pixel data in the input image signal for two pixels which are arranged adjacent to each other in the vertical direction and belong to respective first and second horizontal pixel lines arranged adjacent to each other, and the drive control section supplies the drive signals to the respective first and second sub-pixel electrodes through one source line.

6. The image display device according to claim 2, wherein in the second drive mode, the drive control section determines signal levels of the drive signals to be applied to the respective first and second sub-pixel electrodes which are treated as the single pixel, based on a correlation of pixel data for two pixels and pixel data for a plurality of other pixels in the input image signal, the two pixels being arranged adjacent to each other in the vertical direction and belonging to respective first and second horizontal pixel lines arranged adjacent to each other, the plurality of other pixels being located in a vicinity of the two pixels, and the drive control section supplies the drive signals to the respective first and second sub-pixel electrodes through one source line.

7. An image display device comprising:

a display panel including a plurality of gate lines for scanning which extend in a horizontal direction, a plurality of source lines which extend in a vertical direction to intersect the plurality of gate lines, the source lines being supplied with drive signals based on input image signals, and a plurality of sub-pixel electrodes arranged one by one in positions corresponding to intersections of the plurality of gate lines and the plurality of source lines, each of the sub-pixel electrodes being independently controlled for driving; and a drive control section performing a drive control of the display panel by selectively using two drive modes of a first drive mode and a second drive mode, thereby to display an image based on the input image signal on the display panel, the first drive mode allowing horizontal lines of the plurality of sub-pixel electrodes to be scanned one line at a time through sequentially selecting the plurality of gate lines one by one, and the second drive mode allowing the horizontal lines of the plurality of sub-pixel electrodes to be scanned N lines at a time through sequentially selecting the plurality of gate lines N lines at a time, where N is an integer of 2 or more, wherein in the first drive mode, the drive control section performs display drive in such a manner that a couple of sub-pixel electrodes are driven based on two respective gray scale values different from each other and that a combination of the couple of sub-pixel electrodes is treated as a single pixel, the couple of sub-pixel electrodes being arranged adjacent to each other in the horizontal direction along a gate line and arranged on two respective source lines, and in the second drive mode, the drive control section performs display drive in such a manner that N sub-pixel electrodes consecutively arranged in the vertical direction along a source line are treated as an unit pixel to be driven, wherein the display panel is configured in such a manner that a first sub-pixel electrode and a second sub-pixel electrode having an area different from that of the first sub-pixel electrode are alternately arranged in the horizontal direction as well as in the vertical direction, in the first drive mode, the drive control section performs display drive in such a manner that the first and second sub-pixel electrodes, arranged adjacent to each other in the horizontal direction along a gate line and arranged on two respective source lines, are driven based on two respective gray scale values different from each other, and that a combination of the first and second sub-pixel electrodes is treated as a single pixel, and in the second drive mode, the drive control section performs display drive in such a manner that the horizontal lines of the plurality of sub-pixel electrodes are scanned two lines at a time through sequentially selecting the plurality of gate lines two lines at a time, and that the first and second sub-pixel electrodes, both arranged adjacent to each other in the vertical direction along a source line and arranged along two respective gate lines, are treated as a single pixel, and wherein an area of the second sub-pixel electrode is set to be larger than that of the first sub-pixel electrode, and in the first drive mode, the drive control section performs a display drive in such a manner that a combination of the first and second sub-pixel electrodes arranged at intersections of a first gate line and first and second source lines arranged adjacent to each other is treated as a first pixel, and that a combination of another first sub-pixel electrode and another second sub-pixel electrode arranged at intersections of a second gate line arranged adjacent to the first gate line and the first and second source lines is treated as a second pixel, and a gravity position of a combined region, which is a combination of a region where the first sub-pixel electrode on the first gate line is formed and a region where the other first sub-pixel electrode on the second gate line is formed, corresponds to a center position of a whole region where the first and second pixels are formed.

8. An image display device comprising:

a display panel including a plurality of gate lines for scanning which extend in a horizontal direction, a plurality of source lines which extend in a vertical direction to intersect the plurality of gate lines, the source lines being supplied with drive signals based on input image signals, and a plurality of sub-pixel electrodes arranged one by one in positions corresponding to intersections of the plurality of gate lines and the plurality of source lines, each of the sub-pixel electrodes being independently controlled for driving; and a drive control section performing a drive control of the display panel by selectively using two drive modes of a first drive mode and a second drive mode, thereby to display an image based on the input image signal on the display panel, the first drive mode allowing horizontal lines of the plurality of sub-pixel electrodes to be scanned one line at a time through sequentially selecting the plurality of gate lines one by one, and the second drive mode allowing the horizontal lines of the plurality of sub-pixel electrodes to be scanned N lines at a time through sequentially selecting the plurality of gate lines N lines at a time, where N is an integer of 2 or more, wherein in the first drive mode, the drive control section performs display drive in such a manner that a couple of sub-pixel electrodes are driven based on two respective gray scale values different from each other and that a combination of the couple of sub-pixel electrodes is treated as a single pixel, the couple of sub-pixel electrodes being arranged adjacent to each other in the horizontal direction along a gate line and arranged on two respective source lines, and in the second drive mode, the drive control section performs display drive in such a manner that N sub-pixel electrodes consecutively arranged in the vertical direction along a source line are treated as an unit pixel to be driven, wherein the display panel is configured in such a manner that a first sub-pixel electrode and a second sub-pixel electrode having the area different from that of the first sub-pixel electrode are alternately arranged in the horizontal direction, and are alternately arranged in a period of N lines in the vertical direction, in the first drive mode, the drive control section performs display drive in such a manner that the first and second sub-pixel electrodes, arranged adjacent to each other in the horizontal direction along a gate line and arranged on two respective source lines, are driven based on two respective gray scale values different from each other, and that a combination of the first and second sub-pixel electrodes is treated as a single pixel, and in the second drive mode, the drive control section performs display drive in such a manner that a combination of N first sub-pixel electrodes and N second sub-pixel electrodes is treated as a single pixel, the N first sub-pixel electrodes being consecutively arranged in the vertical direction along the first source line, and the N second sub-pixel electrodes being consecutively arranged in the vertical direction along the second source line adjacent to the first source line, and that the N first sub-pixel electrodes and the N second sub-pixel electrodes are driven based on two respective gray scale values different from each other, and wherein in the second drive mode, the drive control section applies a process of data-thinning-out to the input image signal by thinning out (N−1) horizontal lines for every N horizontal lines, and drives the display panel based on a resultant image signal.

9. The image display device according to claim 1, wherein in the second drive mode, the control drive section scans one screen in a scanning time of 1/N to that in the first drive mode.

10. The image display device according to claim 1, wherein a three dimensional image signal time-divisionally including a left-eye image and a right-eye image which have a parallax therebetween is input, as the input image signal, to the drive control section, and in the second drive mode, in one frame period, the control drive section consecutively repeats display of a left-eye image N times, and consecutively repeats display of a left-eye image N times before or after the display of the right-eye image.

11. A method of driving an image display device controlling a display panel by a drive control section, the display panel including a plurality of gate lines for scanning which extend in a horizontal direction, a plurality of source lines which extend in a vertical direction to intersect the plurality of gate lines, the source lines being supplied with drive signals based on input image signals, and a plurality of sub-pixel electrodes arranged one by one in positions corresponding to intersections of the plurality of gate lines and the plurality of source lines, each of the sub-pixel electrodes being independently controlled for driving, wherein the drive control section performs a drive control of the display panel by selectively using two drive modes of a first drive mode and a second drive mode, to display an image based on the input image signal on the display panel, the first drive modes allowing horizontal lines of the plurality of sub-pixel electrodes to be scanned one line at a time through sequentially selecting the plurality of gate lines one by one, and the second drive mode allowing the horizontal lines of the plurality of sub-pixel electrodes to be scanned N lines at a time through sequentially selecting the plurality of gate lines N lines at a time, where N is an integer of 2 or more, the display panel is configured in such a manner that a first sub-pixel electrode and a second sub-pixel electrode are alternately arranged in the horizontal direction and in the vertical direction, in the first drive mode, the drive control section performs display drive in such a manner that the first and second sub-pixel electrodes, arranged adjacent to each other in the horizontal direction along a gate line and arranged on two respective source lines, are driven based on two respective gray scale values different from each other, and that a combination of the first and second sub-pixel electrodes is treated as a single pixel, and in the second drive mode, the drive control section performs display drive in such a manner that the horizontal lines of the plurality of sub-pixel electrodes are scanned two lines at a time through sequentially selecting the plurality of gate lines two lines at a time, and that the first and second sub-pixel electrodes, both arranged adjacent to each other in the vertical direction along a source line and arranged along two respective gate lines, are treated as a single pixel.

12. An image display device comprising:

a display panel including a plurality of gate lines for scanning which extend in a horizontal direction, a plurality of source lines which extend in a vertical direction to intersect the plurality of gate lines, the source lines being supplied with drive signals based on input image signals, and a plurality of sub-pixel electrodes arranged one by one in positions corresponding to intersections of the plurality of gate lines and the plurality of source lines, each of the sub-pixel electrodes being independently controlled for driving; and a drive control section performing a drive control of the display panel by selectively using two drive modes of a first drive mode and a second drive mode, thereby to display an image based on the input image signal on the display panel, the first drive mode allowing horizontal lines of the plurality of sub-pixel electrodes to be scanned one line at a time through sequentially selecting the plurality of gate lines one by one, and the second drive mode allowing the horizontal lines of the plurality of sub-pixel electrodes to be scanned N lines at a time through sequentially selecting the plurality of gate lines N lines at a time, where N is an integer of 2 or more, wherein in the first drive mode, the drive control section performs display drive in such a manner that a couple of sub-pixel electrodes are driven based on two respective gray scale values different from each other and that a combination of the couple of sub-pixel electrodes is treated as a single pixel, the couple of sub-pixel electrodes being arranged adjacent to each other in the horizontal direction along a gate line and arranged on two respective source lines, and in the second drive mode, the drive control section performs display drive in such a manner that N sub-pixel electrodes consecutively arranged in the vertical direction along a source line are treated as an unit pixel to be driven, and wherein in the second drive mode, the drive control section applies a process of data-thinning-out to the input image signal by thinning out (N−1) horizontal lines for every N horizontal lines, and drives the display panel based on a resultant image signal.

* * * * *